US012604184B2

(12) United States Patent
Luo et al.

(10) Patent No.: US 12,604,184 B2
(45) Date of Patent: Apr. 14, 2026

(54) PRESERVING PRIVACY DURING SECURE TRANSACTIONS WITH AMBIENT POWER DEVICES

(71) Applicant: Cypress Semiconductor Corporation, San Jose, CA (US)

(72) Inventors: Hui Luo, Marlboro, NJ (US); Rakesh Taori, McKinney, TX (US)

(73) Assignee: Cypress Semiconductor Corporation, San Jose, CA (US)

( * ) Notice: Subject to any disclaimer, the term of this patent is extended or adjusted under 35 U.S.C. 154(b) by 100 days.

(21) Appl. No.: 18/767,725

(22) Filed: Jul. 9, 2024

(65) Prior Publication Data

US 2026/0019805 A1 Jan. 15, 2026

(51) Int. Cl.
| | |
|---|---|
| H04W 4/80 | (2018.01) |
| H04W 12/033 | (2021.01) |
| H04W 12/037 | (2021.01) |
| H04W 12/041 | (2021.01) |
| H04W 12/0471 | (2021.01) |
| H04W 12/06 | (2021.01) |

(52) U.S. Cl.
CPC ....... H04W 12/033 (2021.01); H04W 12/041 (2021.01); H04W 12/0471 (2021.01)

(58) Field of Classification Search
CPC ........... H04W 12/033; H04W 12/0471; H04W 12/041; H04W 12/06; H04W 12/08; H04W 12/03; H04W 12/106
See application file for complete search history.

(56) References Cited

U.S. PATENT DOCUMENTS

| | | | | |
|---|---|---|---|---|
| 9,888,337 | B1* | 2/2018 | Zalewski | G06Q 30/0635 |
| 9,911,290 | B1* | 3/2018 | Zalewski | H04W 76/10 |
| 2015/0185716 | A1* | 7/2015 | Wichmann | F02C 9/28 |
| | | | | 700/287 |
| 2017/0315875 | A1* | 11/2017 | Tirupati Nagaraj | |
| | | | | G06F 11/1451 |
| 2018/0283913 | A1* | 10/2018 | Chen | G01D 21/00 |
| 2019/0087771 | A1* | 3/2019 | Westphal | G06Q 10/08 |
| 2023/0256780 | A1* | 8/2023 | Houston | B60C 23/0472 |
| | | | | 701/29.4 |
| 2024/0357348 | A1* | 10/2024 | Saini | H02J 50/20 |
| 2024/0405808 | A1* | 12/2024 | Barton | H04B 7/22 |
| 2025/0024491 | A1* | 1/2025 | Taori | H04W 84/18 |
| 2025/0234191 | A1* | 7/2025 | Luo | H04W 12/06 |
| 2025/0294615 | A1* | 9/2025 | Xu | H04W 8/22 |

* cited by examiner

*Primary Examiner* — Mohammad A Siddiqi

(57) ABSTRACT

A method includes determining, by an ambient power (AMP) device that harvests environmental energy, one or more first authentication and key management (AKM) parameters. The method includes broadcasting, to powered wireless devices, an initialization request frame including one or more frame-exchange parameters, the one or more first AKM parameters, and encrypted content with which a powered wireless device of the powered wireless devices is to establish an encrypted wireless communication session with the AMP device. The content that was encrypted can include an identifier of the AMP device that is also known to the powered wireless device. The method includes using, by the AMP device within the initialization request frame, a first random address as a source media access control (MAC) address and one of a broadcast address or a group address as a destination MAC address.

23 Claims, 17 Drawing Sheets

600

```
┌─────────────────────────────────────────────────────────────┐
│ Determine, by an ambient power (AMP) device that harvest     │
│ environmental energy, one or more first authentication and    │
│ key management (AKM) parameters. 610                          │
└─────────────────────────────────────────────────────────────┘
                            │
                            ▼
┌─────────────────────────────────────────────────────────────┐
│ Broadcast, to multiple powered wireless devices, an          │
│ initialization request frame including one or more frame-    │
│ exchange parameters, the one or more first AKM parameters,    │
│ and encrypted content with which a powered wireless device   │
│ of the plurality of powered wireless devices is to establish  │
│ an encrypted wireless communication session with the AMP     │
│ device (where the content that was encrypted includes an      │
│ identifier of the AMP device that is also known to the        │
│ powered wireless device). 620                                │
└─────────────────────────────────────────────────────────────┘
                            │
                            ▼
┌─────────────────────────────────────────────────────────────┐
│ Use, within the initialization request, a random address as  │
│ a source media access control (MAC) address and one of a     │
│ broadcast address or a group address as a destination MAC    │
│ address. 630                                                 │
└─────────────────────────────────────────────────────────────┘
```

300

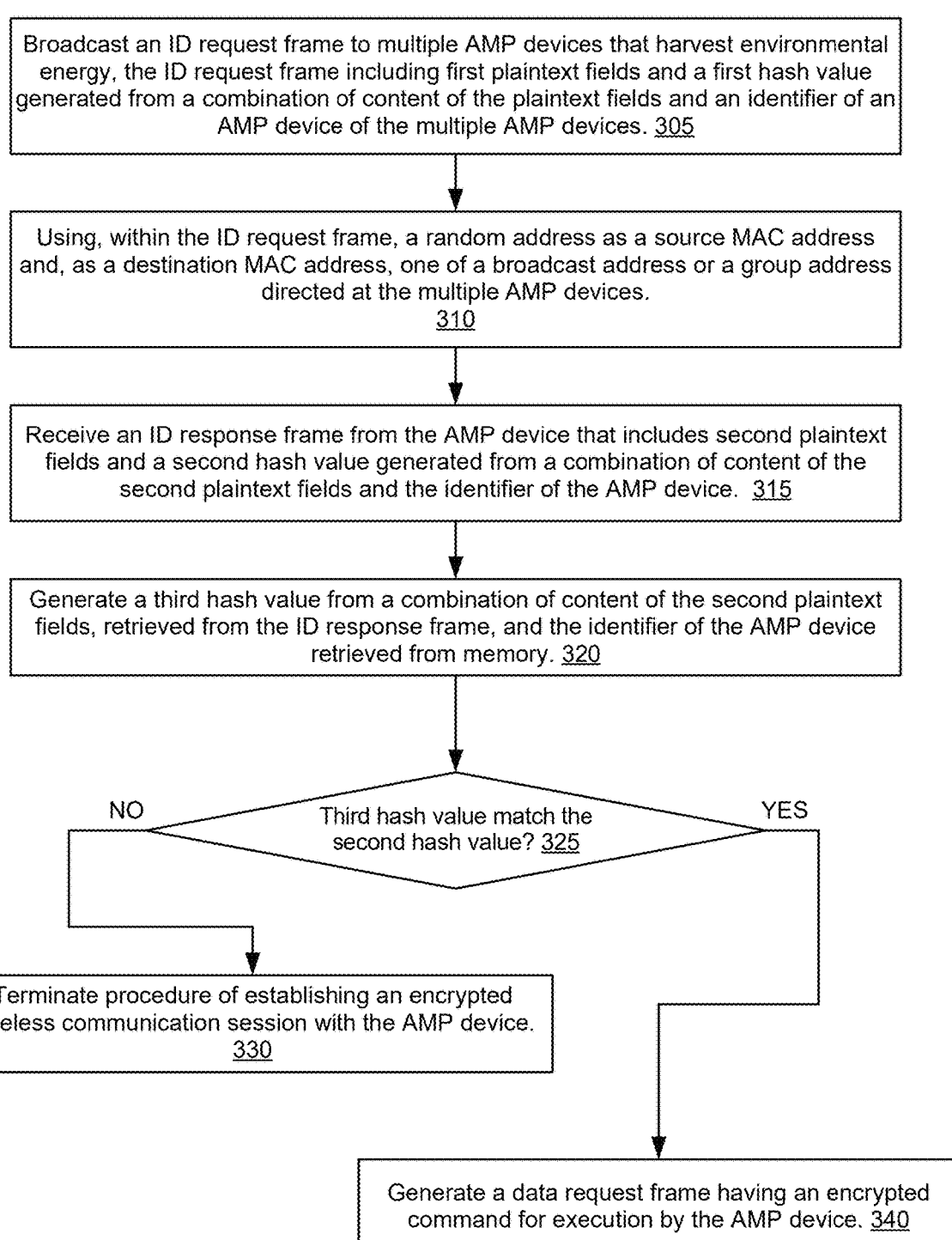

Broadcast an ID request frame to multiple AMP devices that harvest environmental energy, the ID request frame including first plaintext fields and a first hash value generated from a combination of content of the plaintext fields and an identifier of an AMP device of the multiple AMP devices. 305

Using, within the ID request frame, a random address as a source MAC address and, as a destination MAC address, one of a broadcast address or a group address directed at the multiple AMP devices.
310

Receive an ID response frame from the AMP device that includes second plaintext fields and a second hash value generated from a combination of content of the second plaintext fields and the identifier of the AMP device. 315

Generate a third hash value from a combination of content of the second plaintext fields, retrieved from the ID response frame, and the identifier of the AMP device retrieved from memory. 320

NO          Third hash value match the second hash value? 325          YES

Terminate procedure of establishing an encrypted wireless communication session with the AMP device.
330

Generate a data request frame having an encrypted command for execution by the AMP device. 340

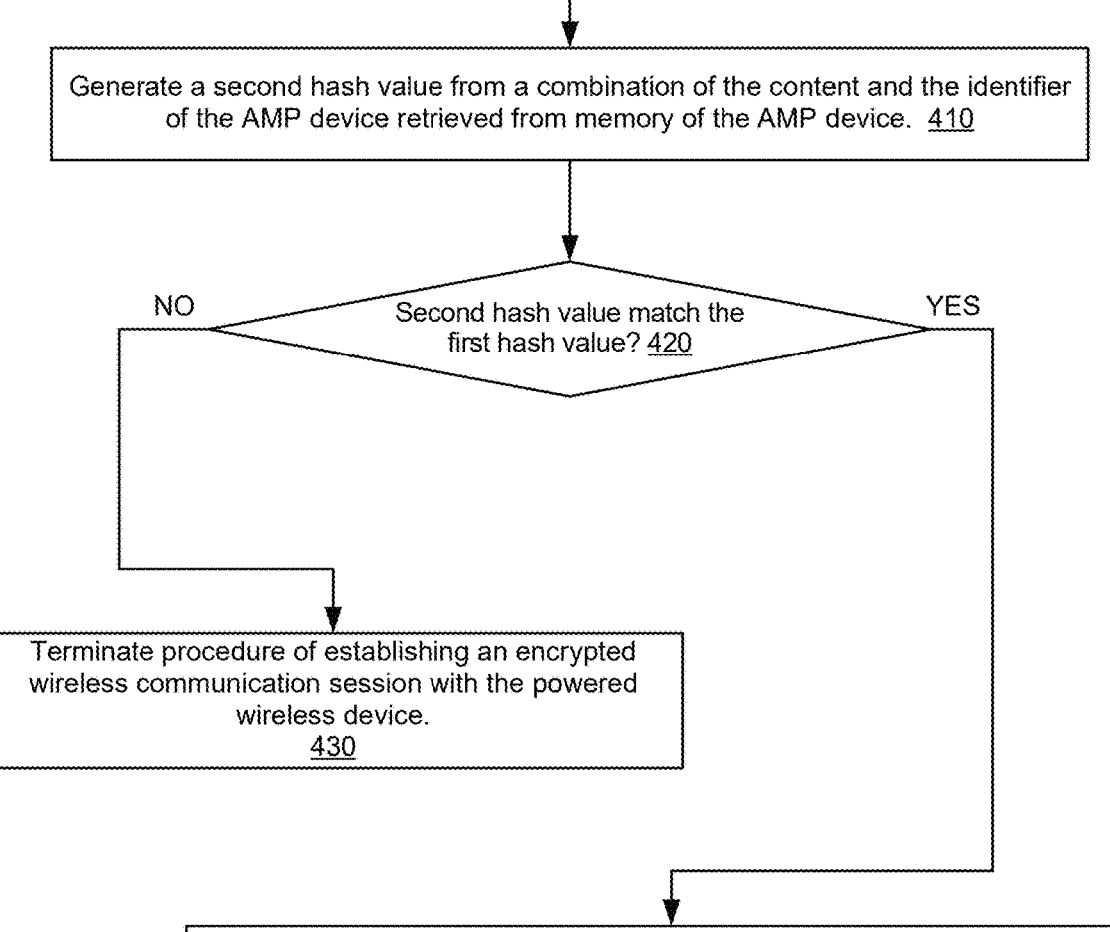

Receive an ID request frame broadcast by a powered wireless device to multiple AMP devices, where a source MAC address of the ID request frame is a random address, and the ID request frame includes a first plurality of plaintext fields and a first hash value generated from a combination of a content of the first plurality of plaintext fields and an identifier of the AMP device. 405

Generate a second hash value from a combination of the content and the identifier of the AMP device retrieved from memory of the AMP device. 410

NO    Second hash value match the first hash value? 420    YES

Terminate procedure of establishing an encrypted wireless communication session with the powered wireless device.
430

Generate an ID response frame including one or more first authentication and key (AKM) parameters with which to establish an encrypted wireless communication session with the powered wireless device. 440

Determine, by an ambient power (AMP) device that harvest environmental energy, one or more first authentication and key management (AKM) parameters. <u>610</u>

Broadcast, to multiple powered wireless devices, an initialization request frame including one or more frame-exchange parameters, the one or more first AKM parameters, and encrypted content with which a powered wireless device of the plurality of powered wireless devices is to establish an encrypted wireless communication session with the AMP device (where the content that was encrypted includes an identifier of the AMP device that is also known to the powered wireless device). <u>620</u>

Use, within the initialization request, a random address as a source media access control (MAC) address and one of a broadcast address or a group address as a destination MAC address. <u>630</u>

Figure 7:
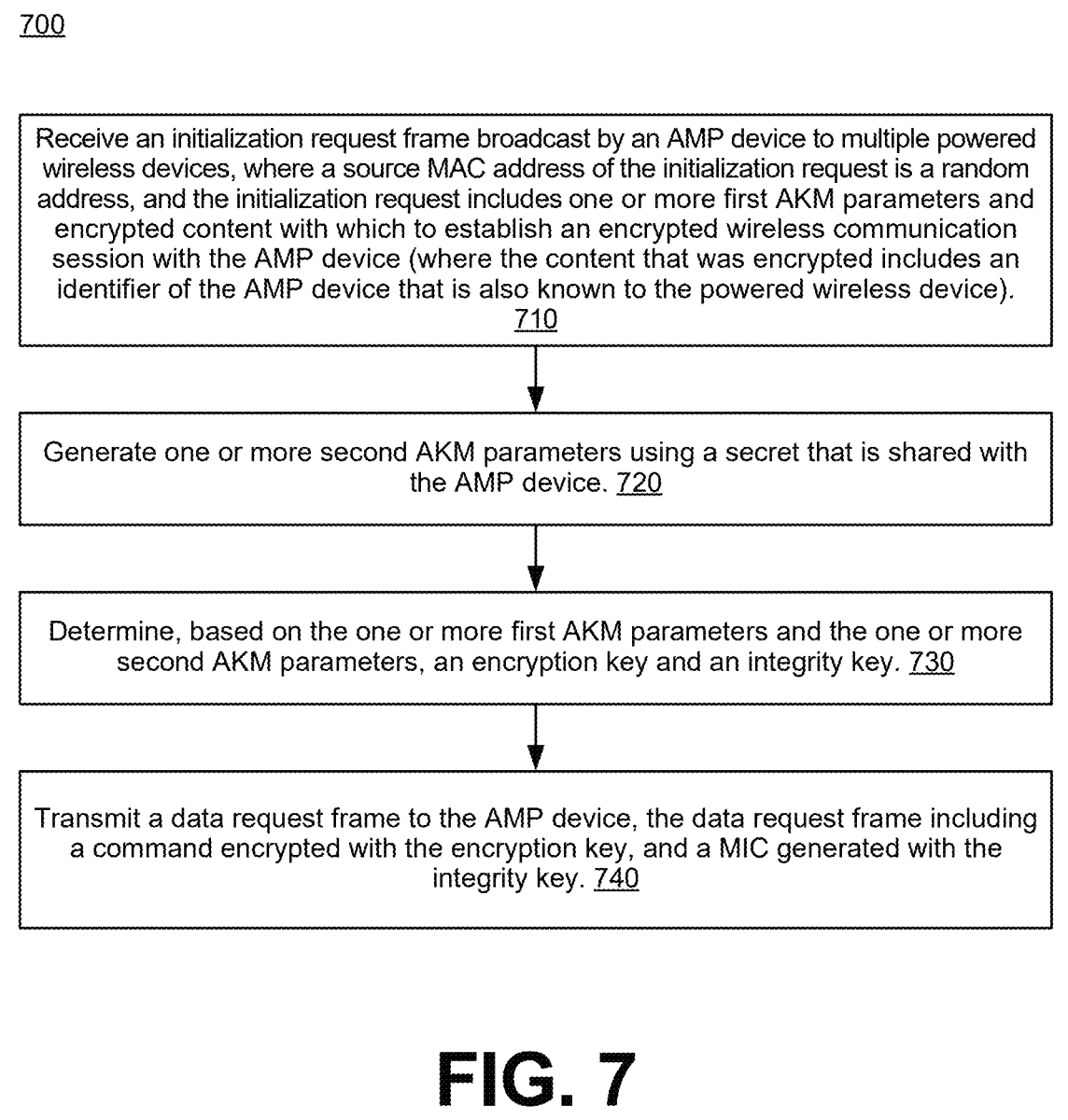

Receive an initialization request frame broadcast by an AMP device to multiple powered wireless devices, where a source MAC address of the initialization request is a random address, and the initialization request includes one or more first AKM parameters and encrypted content with which to establish an encrypted wireless communication session with the AMP device (where the content that was encrypted includes an identifier of the AMP device that is also known to the powered wireless device).
710

Generate one or more second AKM parameters using a secret that is shared with the AMP device. 720

Determine, based on the one or more first AKM parameters and the one or more second AKM parameters, an encryption key and an integrity key. 730

Transmit a data request frame to the AMP device, the data request frame including a command encrypted with the encryption key, and a MIC generated with the integrity key. 740

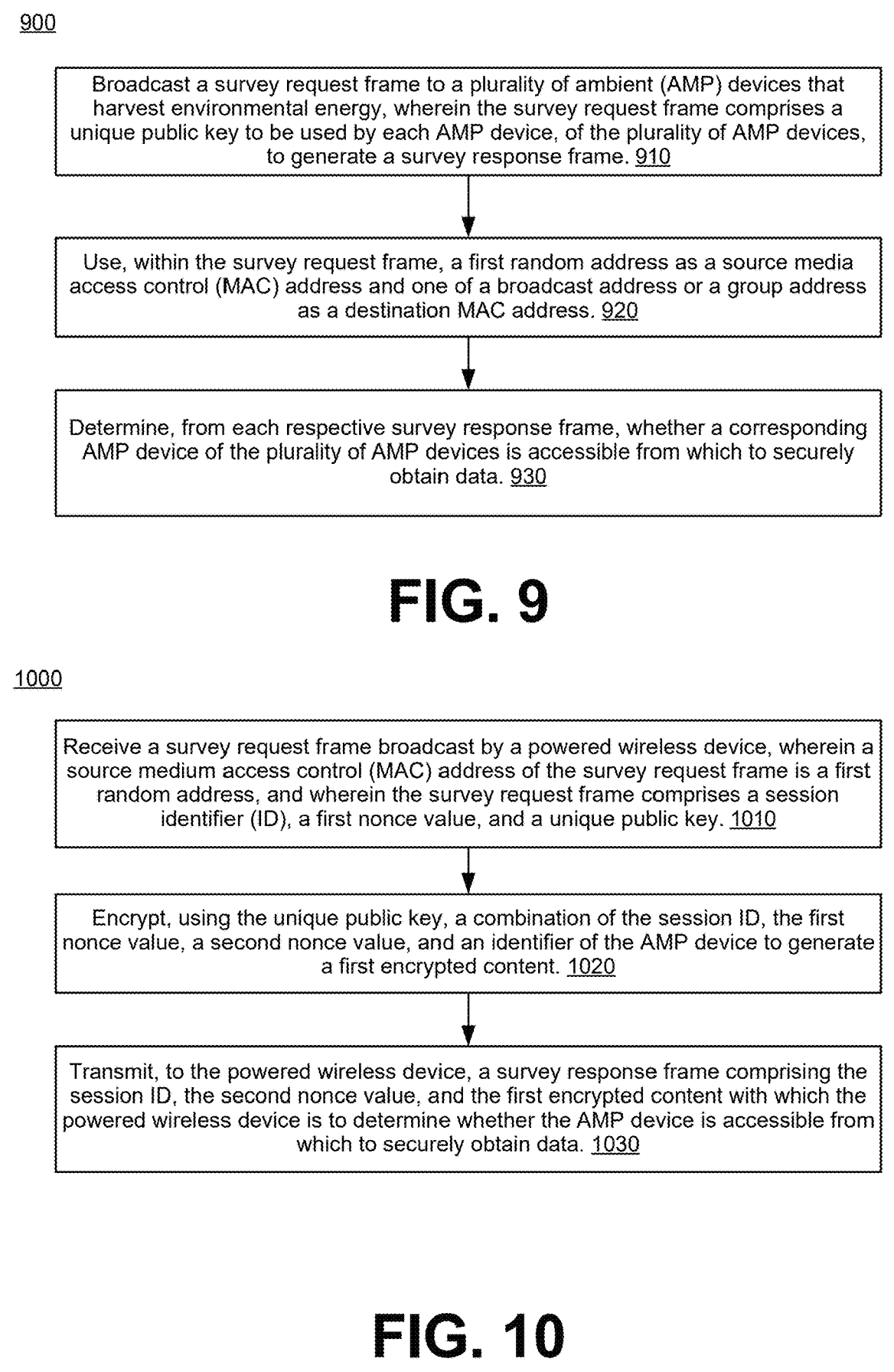

> Broadcast a survey request frame to a plurality of ambient (AMP) devices that harvest environmental energy, wherein the survey request frame comprises a unique public key to be used by each AMP device, of the plurality of AMP devices, to generate a survey response frame. 910

> Use, within the survey request frame, a first random address as a source media access control (MAC) address and one of a broadcast address or a group address as a destination MAC address. 920

> Determine, from each respective survey response frame, whether a corresponding AMP device of the plurality of AMP devices is accessible from which to securely obtain data. 930

> Receive a survey request frame broadcast by a powered wireless device, wherein a source medium access control (MAC) address of the survey request frame is a first random address, and wherein the survey request frame comprises a session identifier (ID), a first nonce value, and a unique public key. 1010

> Encrypt, using the unique public key, a combination of the session ID, the first nonce value, a second nonce value, and an identifier of the AMP device to generate a first encrypted content. 1020

> Transmit, to the powered wireless device, a survey response frame comprising the session ID, the second nonce value, and the first encrypted content with which the powered wireless device is to determine whether the AMP device is accessible from which to securely obtain data. 1030

FIG. 10

PRESERVING PRIVACY DURING SECURE TRANSACTIONS WITH AMBIENT POWER DEVICES

TECHNICAL FIELD

This disclosure relates to wireless devices and, more specifically, to preserving privacy during secure transactions with ambient power devices.

BACKGROUND

Radio frequency (RF) wireless devices have grown in type and capability. In some wireless local area networks (WLANs), ambient power (AMP) devices, which harvest energy from the environment, can be effectively deployed as low-cost wireless data collection sensors. Some use cases include tagging containers of retail products traveling from and between warehouses and tagging luggage being transported from and between air transportation and within airports. Other use cases include tracking or reporting environmental data such as temperature, proximity, pressure, or light data collected by a sensor. Due to the limited power available for processing incoming requests, communications with AMP devices are not secured and are often initiated by a non-AMP device (e.g., a powered wireless device).

BRIEF DESCRIPTION OF THE DRAWINGS

FIG. 3 is a flow diagram of an example method for preserving privacy in a secure transaction initiated by a powered wireless device according to at least one embodiment.

FIG. 4 is a flow diagram of a method that explains the example method of FIG. 3 from an perspective of an AMP device according to at least one embodiment.

FIG. 6 is a flow diagram of an example method for preserving privacy in a secure transaction initiated by an AMP device according to at least one embodiment.

FIG. 7 is a flow diagram of a method that explains the example method of FIG. 6 from a perspective of a powered wireless device according to at least one embodiment.

FIG. 9 is a flow diagram of an example method for preserving privacy during discovery of and a secure transaction with AMP devices, as initiated by a powered wireless device according to at least one embodiment.

FIG. 10 is a flow diagram of an example method for preserving privacy during discovery of and a secure transaction with AMP devices, from the perspective of one of the AMP devices according to at least one embodiment.

DETAILED DESCRIPTION

Figure 1A:
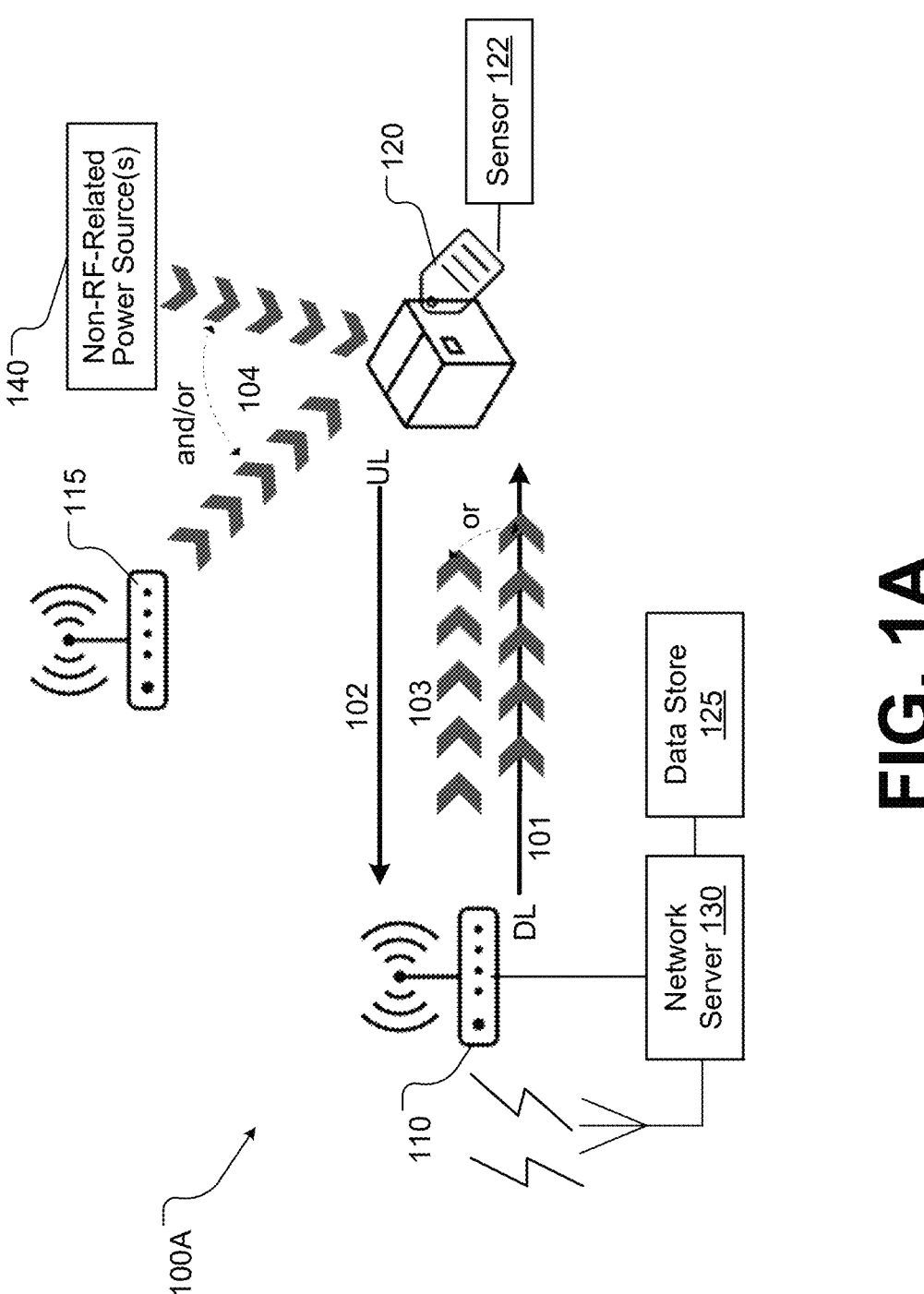
FIG. 1A is a block diagram of an exemplary wireless network configured with RF band arrangements for downlink and uplink transmissions between a powered wireless device and an AMP device according to various embodiments.

The following description sets forth numerous specific details such as examples of specific systems, devices, components, methods, and so forth, in order to provide a good understanding of various embodiments of preserving privacy (or anonymity) during secure transactions with ambient power (AMP) devices. Some wireless AMP devices, e.g., AMP wireless clients, are simple wireless devices needing little processing power and memory, and thus can operate with little power. These AMP devices harvest (or scavenge) energy from the environment sufficient for brief and reduced processing. For example, AMP devices may communicate an identifier (ID) and/or other data being gathered by a sensor of or that is coupled to the AMP device. Powered wireless devices, such as routers, access points, powered client devices, etc., may be referenced in this way within mesh networks because the devices receive external continuous power, in contrast to AMP devices which do not receive continuous external power.

Due to the limited power available for receiving and processing incoming requests, as well as processing and transmitting outgoing responses, communication sessions with wireless AMP devices are often unencrypted, including passing an ID such as a medium access control (MAC) address of each device as cleartext. Thus, establishing and maintaining an encrypted communication session can require each device participating in the encrypted communication session to maintain constant communication. This type of constant communication is not always possible or feasible for an AMP device.

Further, typical communication in a WLAN between wireless clients and powered wireless devices requires extensive handshake protocols to ensure authentication and verification of connected devices (e.g., to establish a secured network or wireless communication session) in addition to encryption of data exchanged between the AMP wireless clients and powered wireless devices (e.g., once the secured wireless communication session is established). For example, many encryption methods can require two devices to transmit several frames of data in order to authorize each device, then several frames to establish an encryption (e.g., determine respective encryption keys) and then one or more frames to transmit and receive encrypted data. These more extensive protocol-based attachment methods are inconsistent with the low-power nature of the AMP devices due to the amount of power required. Without encryption, AMP devices may not be deployed in many practical settings, due to the risk of transmitting and receiving unencrypted data, which risks are increasingly of concern related to Internet of Things (IoT) devices. These risks may be increased when initiating a wireless communication session while openly transmitting cleartext IDs of each device, e.g., of the powered wireless device and of the AMP device.

Communication between a powered wireless device and an AMP device is often initiated by the powered wireless device. If the powered wireless device is unaware of the location, existence, proximity, etc., of the AMP device, the powered wireless device may be unable to initiate a procedure to establish communication with the AMP device. For example, an AMP device may be deployed in a first location, but may be transported (intentionally or unintentionally) to a second location. If a powered wireless device does not know to look for the AMP device (e.g., initiate a communication with the AMP device) in the second location, the powered wireless device may be unlikely to initiate a communication with the AMP device in the second location. Further, even if a communication initiation attempt is made in the second location, the powered wireless device typically transmits an initialization frame that includes, in cleartext, the ID of the AMP device as the destination MAC address and an ID of itself, the powered wireless device, as the source MAC address. Thus, initialization and the wireless communication session that is established might lack the privacy to which powered wireless devices are accustomed in typical network communication sessions with non-AMP devices.

Aspects of the present disclosure resolve these and other deficiencies with known approaches to employing AMP devices in WLAN-based systems, by providing methods for preserving privacy (or anonymity) during secure transactions with AMP devices. In some embodiments, the present disclosure provides various methods and systems in which an AMP device can initiate an encrypted wireless communication session with powered wireless devices (or a powered wireless device can initiate the encrypted wireless communication session with multiple AMP devices) via a minimal exchange of data exchange frames in a way that hides the true identify of the respective powered wireless and AMP device(s) participating in the encrypted communication session. In this way, the privacy (or anonymity) of each powered wireless device and each AMP device can be preserved and power consumption minimized for the AMP device(s).

In some embodiments, the powered wireless device establishes the encrypted communication session with the AMP device. That is, in some embodiments, the AMP device can broadcast an initialization request frame to multiple powered wireless devices to begin the process of establishing the encrypted communication session. In embodiments, the initialization request frame includes one or more frame-exchange parameters, one or more authentication and key management (AKM) parameters, and encrypted content with which a powered wireless device of the multiple powered wireless devices establishes an encrypted wireless communication session with the AMP device. In embodiments, the content that was encrypted includes an identifier of the AMP device (e.g., AMP ID) that is also known to the powered wireless device, e.g., but not to other ones of the multiple powered wireless devices. In this way, an AMP ID of the AMP device is kept private, but can be revealed to the powered wireless device by decrypting the encrypted content and retrieving the AMP ID from its memory.

In these or alternative embodiments, the AMP device also includes, in the initialization request frame, a first random address as a source MAC address and a broadcast address or a group address as a destination MAC address directed at the multiple powered wireless devices. In this way, initialization of the encrypted wireless communication session can hide the true source MAC address of the AMP device and a certain number of powered wireless devices each determines whether the powered wireless device is authorized to proceed with securely communicating with the AMP device. When transmitting a data request frame to the AMP device, the powered wireless device can also generate its own random address and use this second random address as its source MAC address to similarly hide its true identity from other interloping wireless devices.

In other embodiments, the powered wireless device can broadcast an ID request frame to multiple AMP devices to determine with which AMP device the powered wireless device is authorized to establish an encrypted wireless communication session. In embodiments, the ID request frame includes a first plurality of cleartext fields and a first hash value generated from a combination of a content of the first plurality of cleartext fields and an identifier of the AMP device, which is thus kept private. Each AMP device can then generate a second hash value using this content and the AMP identifier (e.g., AMP ID) retrieved from its memory. Each AMP device can determine whether the first hash value matches the second hash value. In embodiments, if there is a match for a particular AMP device, then the particular AMP device determines it has authorization and is able to proceed with further operations to establish the encrypted wireless communication session. Otherwise, in response to determining that the first hash value does not match the second hash value, an AMP device can terminate a procedure of establishing the encrypted wireless communication session with the powered wireless device.

In these or alternative embodiments, the powered wireless device also includes, in the ID request frame, a first random address as a source MAC address and a broadcast address or a group address as a destination MAC address directed at the multiple AMP devices. In this way, initialization of the encrypted wireless communication session can hide the true source MAC address of the powered wireless device and a certain number of AMP devices (e.g., that are in range and receive the broadcasted ID request frame) each determines whether it is authorized to proceed with securely communicating with the powered wireless device. In generating and transmitting ID response frames, each AMP device can also generate its own, e.g., second random address and use this second random address as a source address while using the first random address as the destination address for the powered wireless device. In this way, both the initiating powered wireless device and responding AMP devices can hide their true identities from interloping wireless devices.

In further embodiments, sometimes one or more powered wireless devices are unaware of AMP devices within a wireless distance of the powered wireless device(s) and whether these AMP devices are accessible by the powered wireless device(s) from which to obtain data, e.g., sensor data, security data, environmental data, and the like. In at least some embodiments such as this, an exemplary powered wireless device can broadcast a survey request frame to the AMP devices that includes a unique public key to be used by each AMP device to generate a survey response frame. In some embodiments that employ the network server, the powered wireless device obtains a server public key from the network server and sends this server network key in the survey request frame. The powered wireless device can also use, within the survey request frame, a first random address as a source MAC address and one of a broadcast address or a group address as a destination MAC address, as per other embodiments discussed herein.

In such further embodiments, each AMP device, in response to the survey request frame, can first verify previous knowledge of the unique public key (or server public key) and then encrypt particular values using the unique (or server) public key. For example, these values can be a session ID, a first nonce value received in the survey request frame, a second nonce value (generated by the AMP device), and an identifier of the AMP device. Each AMP device can then generate and transmit a survey response frame that includes at least one or more of these values in cleartext as well as the encrypted content, although the powered wireless device already can know the first nonce value. Each survey response frame can include the first random address as the destination MAC address and a second random address as the source MAC address of a respective AMP device. Upon receipt of each survey response frame, the powered wireless device can decrypt the encrypted content with the same unique (or server) public key and compare the decrypted contents with cleartext versions of these values. In response to matching the decrypted values with the cleartext values, the powered wireless device can determine that a respective AMP device is accessible from which to securely obtain the data, e.g., is authorized to access those particular AMP devices. In this way, a given powered wireless device can discover AMP devices within its environment with which the powered wireless device is authorized to communicate and obtain data even though the presence of those AMP devices were previously unknown.

In addition to keeping the identify of AMP devices private, as well as keeping private the MAC addresses of AMP devices and powered wireless devices that engage in wireless communication session, in some embodiments, authentication and key generation may be embedded in a brief data exchange initiated by the powered wireless device (or the AMP device), thus eliminating the need for any extra frame exchanges for establishing a secure association state.

In some embodiments, authentication and key generation for the powered wireless device can be performed by a network server communicatively coupled to the powered wireless device. The network server can authorize, on behalf of a particular powered wireless device, a communication between the AMP device and the particular powered wireless device. Thus, the network server can provide the AMP device with the functionality of dynamic user access control and credential management of powered wireless devices.

For example, in some embodiments, the network server, on behalf of the powered wireless device, generates an encryption key before mutual authentication, just at the time when the powered wireless device needs the encryption key to encrypt a data request frame. Later, the powered wireless device-to-AMP device authentication can be performed at the AMP device after the AMP device receives the encrypted data request frame. In the same manner, key generation at the AMP device can be performed before mutual authentication, just at the time when the AMP device needs the encryption key to encrypt a data response frame. Later, the AMP device-to-powered wireless device authentication can be performed at the powered wireless device (e.g., using information obtained from the securely coupled network server) after the powered wireless device receives the data response frame. At this point, in at least some embodiments, the one-shot encrypted data exchange finishes and the mutual authentication finishes at the same time.

In some embodiments, for example, authentication information and encryption key information is embedded into the data exchange frames that contain encrypted data. In this way, authentication between the devices can be accomplished at the same time that encrypted data is transmitted, thus reducing the quantity of frames required to transmit/receive an authenticated and encrypted communication. That is, the AMP device can receive encrypted data from the powered wireless device before the AMP device has authorized the powered wireless device, and similarly, the powered wireless device can receive encrypted data from the AMP device before the powered wireless device has authorized the AMP device. The powered wireless device can perform an additional operation to authorize the AMP device (e.g., by communicating with a network server that has a shared secret with the AMP device).

Advantages of the present disclosure include, but are not limited to, preserving the privacy (or anonymity) during secure transactions with ambient devices, which includes enabling random MAC addresses for both a powered wireless device (e.g., a reading device) and each AMP device (e.g., a read device). For example, by using a random MAC address as a source address, either of the AMP device or the powered wireless device that initiates communication can prevent itself from being tracked or discovered as the source of that initiation. Further, use of random MAC addresses can prevent the type of encrypted communications from being identified in communicated frames or packets, providing for enhanced security related to the encrypted communications between a powered wireless device and one or more AMP devices.

Additional advantages include the ability to initiate secure communication by an AMP device despite the fact that the AMP devices are able to operate infrequently, at low power, and with minimal stored data. The addition of an authentication network server allows the AMP device to store, and subsequently transmit, a static network address (e.g., a uniform resource locator (URL) or other network address) to the network server. The network server can then determine whether the powered wireless device is authorized to communicate with the AMP device. As such, the AMP device is not performing the dynamic user access control, which could have power requirements that exceed the power available to the AMP device. Additional advantages will be apparent to those skilled in the art of WLAN-related data collection and tracking systems that employ AMP devices, and are further discussed below.

FIG. 1 is a block diagram of an exemplary wireless network 100A configured with RF band arrangements for downlink (DL) and uplink (UL) transmissions between a powered wireless device 110 and an AMP device 120, e.g., AMP client wireless device, according to various embodiments. In some embodiments, the powered wireless device 110 is an access point, a router, a wireless hub, a mobile hotspot device, or a wireless (or cellular) base station, a client device, or the like that is externally powered. In some embodiments, the powered wireless device 110 can be externally powered by direct current (DC) voltage sources and/or alternating current (AC) power sources. For example, the powered wireless device 110 can be externally powered by DC power source such as a battery (e.g., a laptop, or mobile phone battery). In another example, the powered wireless device 110 can be externally powered by an AC power source such as a wall socket, or building mains voltage. In various embodiments, the AMP device 120 is a wireless identification tag or a low-power client wireless device or AMP station (STA). As illustrated, the wireless network 100A can include a second powered wireless device 115, a data store 125, and a non-RF-related power source 140.

In some embodiments, the powered wireless device 110 communicates to a network server 130 to upload data to a cloud. In some embodiments, the network server 130 can be a WLAN server. In these embodiments, the network server 130 includes or is coupled to a data store 125 of volatile and/or non-volatile memory, e.g., within cloud-based storage that exists in a local cloud or edge cloud or the like. In this way, data/information collected by the powered wireless device 110 can be stored, by the network server 130, in the data store 125 where the data can optionally be indexed against respective AMP devices 120, e.g., in a database or the like. In various embodiments, the data or information collected and stored includes an identification and/or a location of the AMP device 120, temperature data, humidity data, pressure data, level data (e.g., level of fluid or gas within a container), and/or other data associated with an environment of the AMP device 120. In some embodiments, the data or information is a log or array of information to include a data history of the AMP device 120 that includes environmental data or information collected over time. The sensor-related data may be detected from a sensor 122 (or multiple sensors) included within or coupled to the AMP device 120.

In some embodiments, the network server 130 can perform one or more authentication operations on behalf of the powered wireless device 110. The network server 130 can determine whether the powered wireless device 110 is authorized to communicate with the AMP device 120. If the powered wireless device 110 is authorized to communicate with the AMP device 120, the network server 130 can provide communication parameters to the powered wireless device 110 for the communication between the powered wireless device 110 and the AMP device 120. In some embodiments, the communication parameters can include one or more AKM parameters, an encryption key, temporary secrets, or other indicators that cause the powered wireless device 110 to initiate an encrypted wireless communication session with the AMP device 120.

In some embodiments, the network server 130 determines whether the powered wireless device 110 is authorized to communicate with the AMP device 120 based on an ID of the AMP device 120 (e.g., an AMP ID) and an ID associated with the powered wireless device 110 (e.g., a user ID). For example, the powered wireless device 110 can be directed to the network server 130 by the AMP device 120 (e.g., using a network address such as a URL) when the powered wireless device 110 initiates a procedure to establish an encrypted wireless communication session with the AMP device 120. The powered wireless device 110 can request authorization from the network server 130 to communicate with the AMP device 120. If the network server 130 determines the powered wireless device 110 is authorized to communicate with the AMP device 120, the network server 130 can provide one or more authentication and key management (AKM) parameters, an encryption key, and/or a temporary secret to the powered wireless device 110. The temporary secret can be used by the powered wireless device 110 to generate the one or more AKM parameters and/or an encryption key; although, in some embodiments, the encryption key is directly supplied to the powered wireless device in a secured Internet session.

In many embodiments, there are one or more powered wireless devices 110 and many client wireless devices, which are AMP devices 120, as disclosed herein. Ambient power (AMP) devices are energized by harvesting energy from RF signals (e.g., RF-related power sources) and/or from non-RF-related power sources 140 (e.g., the AMP device 120 can harvest environmental energy). In various embodiments, harvested energy from RF-related power sources are from in-band RF power sources (e.g., within the same RF band being used for downlink/uplink (DL/UL) transmissions) or out-of-band RF power sources (e.g., downlink (DL) and uplink (UL) transmissions take place in different RF bands compared to RF band being used for energy harvesting). In additional embodiments, non-RF-related power sources include solar or photovoltaic cells (convert ambient sunlight into electricity), thermoelectric generators (convert temperature gradients into electricity), vibration energy harvesting using piezoelectric, electro-static, and electromagnetic converters (convert mechanical vibrations from the environment into electricity), miniature wind turbines (convert ambient wind energy into electrical power), pressure differential energy harvesting, dynamos or wearable harvesters (convert human or animal motion into electrical energy), and other such energy-harvesting mechanisms. In some embodiments, the AMP device 120 can harvest environmental energy using one or more collection circuits (e.g., AMP collection circuits). The collection circuits can include circuitry that can harvest any of the above-mentioned electrical potential energy (e.g., the collection circuit can be configured to harvest environmental energy).

In some embodiments, the powered wireless device 110 does not transmit the energizing RF signal. For example, in other embodiments, the wireless network 100A further includes a second powered wireless device 115 and/or non-RF-related power sources 140 that provide RF power and/or non-RF power, respectively, from which the AMP device 120 harvests environmental energy (e.g., from power sources other than from the powered wireless device 110 associated with the DL/UL transmissions). In at least some embodiments, the second powered wireless device 115 transmits an energizing RF signal (104) towards the client wireless device from which the client wireless device harvests energy. In further embodiments, the energizing signals (101) or (103) are combined with the energizing RF signal (104). Further, non-RF-related energy harvesting may be employed alone or in combination with RF-related energy harvesting.

With additional reference to FIG. 1, in at least one embodiment, the powered wireless device 110 transmits a first wireless signal (101), which is a DL transmission, over a first RF band to the AMP device 120. In some embodiments, the first wireless signal includes a data packet (or frame) requesting information from the AMP device 120. The AMP device 120 may receive the first wireless signal and parse the data packet to determine the requested information.

In these embodiments, the AMP device 120 transmits a second wireless signal (102), which is an UL transmission, over a second RF band to the powered wireless device 110 with a data packet (or frame) with the requested information. In this way, the requested information or data (discussed previously) may be requested and received from the AMP device 120 through data packet (or data frame) exchange. In various embodiments, the powered wireless device 110 generates the first wireless signal employing technology such as Wi-Fi®, Bluetooth®, Bluetooth® Low Energy, Ultra-Wideband (UWB), Z-wave™, Zigbee®, LoRa™, Wi-SUN®, or other wireless protocol. In various embodiments, the AMP device 120 generates the second wireless signal employing technology such as Wi-Fi®, Bluetooth®, Bluetooth® Low Energy, Ultra-Wideband (UWB), Z-wave™, Zigbee®, LoRa™, Wi-SUN®, or other wireless protocol.

In some embodiments, the first RF band for DL transmission differs from the second RF band used for UL transmission. In some embodiments, the second RF band operates at a lower frequency range than that of the first RF band, e.g., as low frequencies consume less power. Lower frequencies also exhibit smaller path losses compared to higher frequencies and, at the same power, the wireless signals can be adequately received and decoded at a farther distance and propagate through or around obstacles better compared to higher frequencies. Further, RF and circuit design at lower frequencies can be far less complex compared to being designed for at higher frequency operation, keeping costs low for the AMP devices 120.

In some embodiments, the second RF band operates at a higher frequency range than that of the first RF band, e.g., higher frequency operations deploy wider channel bandwidths, which in turn allow a transmission of the same number of user bytes and finish earlier. The AMP device 120 may then receive and/or transmit for a shorter period of time, conserving power and providing a separate power consumption benefit. Accordingly, use of a higher frequency range or a lower frequency range with the UL transmission (compared to the DL transmission) may involve a cost-benefit analysis that weighs these benefits as between higher or lower frequency ranges.

In other embodiments, the first RF band is the same as the second RF band, but the DL transmission and the UL transmission occur over different frequencies with significant separation (e.g., more than a few 100 megahertz (MHz) within that same RF band. In these ways, both the technology and RF bands (or frequencies) can differ as between the DL/UL transmissions so that AMP devices 120 can operate at lower power while avoiding frequency conflicts between the DL and UL transmissions.

In various embodiments, the first wireless signal (101), e.g., transmitted in the first RF band, is also an energizing RF signal, illustrated with thick directional indicators, from which the AMP device 120 harvests environmental energy. In similar embodiments, the powered wireless device 110 instead transmits a separate energizing RF signal (103) towards the AMP device 120, but this separate energizing RF signal (103) is also within the first RF band, e.g., is not necessarily the same as the first wireless signal (101), but may be close in frequency. In alternative embodiments, the separate energizing RF signal (103) is transmitted over the second RF band, e.g., of the UL transmission, or is transmitted over an entirely different third RF band. Accordingly, in differing embodiments, the energizing RF signal (103) is sent over the first RF band, the second RF band, or the third RF band. For example, in some embodiments by way of example, the first RF band is 5.0 gigahertz (GHz), the second RF band may be 2.4 GHz, and the third RF band may be 5.0 or 6.0 GHz, where the third RF band may also be employed by the powered wireless device 110 to communicate with other mobile stations (STA).

Data can be communicated between the powered wireless device 110 and the AMP device 120 as frames in a request-and-response protocol. The request-and-response protocol can be based on a secret that is shared between the network server 130 and the AMP device 120, as described above. The secret can be stored in the data store 125 (or other secure location) and programmed to the AMP device 120 during manufacturing or before deployment within an operational network.

In some embodiments, the request-and-response protocol between the powered wireless device 110 and the AMP device 120 is compatible with the carrier sense multiple access with collision avoidance (CSMA/CA) network protocol. In some embodiments, the request-and-response protocol between the powered wireless device 110 and the AMP device 120 is compatible with the request-to-send/clear-to-send (RTS/CTS) network protocol. In some embodiments, the request-and-response protocol between the powered wireless device 110 and the AMP device 120 is compatible with backscattering.

TABLE 1

| First Field | Second Field | Third Field | Fourth Field | Fifth Field |
|---|---|---|---|---|
| Recipient ID | Sender ID (or Random MAC) | Frame Type | Data Body | Frame Check Data |

Frames (or packets) can include information organized into at least five fields, as shown in Table 1, although not every frame need to include every field and some frames may have these fields in different orders, depending on implementation and application. Further, in some of the latter embodiments discussed herein, the AMP ID is encrypted or subject to a hash algorithm within the data body to maintain privacy. In various embodiments, the first field of the frame includes the recipient ID (e.g., the ID of the powered wireless device 110, or the ID of the AMP device 120). In some embodiments, the recipient ID is the media access control (MAC) address of the recipient device, e.g., also referred to herein as a destination MAC address. In alternative embodiments, the recipient ID is a unique, pre-assigned ID, e.g., assigned at manufacturing or before deployment within an operational network. For example, in some embodiments, power harvested by the AMP device 120 is insufficient to perform program operations on non-volatile memory, and the AMP device 120 can have a unique ID (e.g., AMP ID) programmed into non-volatile memory of the AMP device 120 at an initial factory setup with external power. Some request frames received at the AMP device 120 can have the ID of the AMP device 120 in the first field. Some responses received at the powered wireless device 110 can have the ID of the powered wireless device 110 in the first field.

In some embodiments, particularly those discussed herein, each recipient ID is the random address with which the particular recipient wireless device initiated wireless communication (e.g., as the transmission device). For example, the random address used in the initial communication between the AMP device 120 and the powered wireless device 110 can be retained for the entirety of a single wireless communication session and be regenerated for any subsequent wireless communication session. In this way, random addresses can be used throughout the wireless communication sessions to retain the privacy or anonymity of each wireless device authenticated (or otherwise approved) to take part in the particular wireless communication session according to various embodiments.

In some embodiments, the recipient ID identifies a particular subset of recipient devices (e.g., multiple AMP devices 120). For example, the recipient ID can be a subset of MAC addresses (e.g., a group address such as a MAC multicast address) corresponding to the particular subset of AMP devices 120. In some embodiments, the recipient ID identifies any recipient device (e.g., any AMP device 120) within a wireless connection range of a sender device (e.g., the powered wireless device 110). For example, the recipient ID can be a MAC broadcast address such as FF: FF: FF: FF: FF: FF.

In various embodiments, the second field of the frame includes the sender ID (e.g., the ID of the powered wireless device 110 or the ID of the AMP device 120, generally referred to as a transmission device). As discussed, to maintain privacy of the transmission device, the sender ID can be a random MAC address so wireless devices that capture a transmitted frame (or packet) cannot identify or track the transmission device just based on a cleartext device ID retrieved out of the air. Responses to such an initialization (or ID) request frame or a data request (or response) frame can continue to use the random MAC address during a given encrypted wireless communication session, but determine the true identity of the transmission device in other ways, as will be discussed in detail.

In various embodiments, the third field of the frame includes the frame type, which can identify the type of frame, e.g., initialization request frame, ID response frame, data request frame, data response frame. In some embodiments, the frame type identified in the third field is based on or defines information located in the data body of the fourth field.

In various embodiments, the fourth field of the frame includes the data body, which can include frame-exchange parameters, data, commands, authentication and key management (AKM) parameters (e.g., Simultaneous Authentication of Equals (SAE)), cipher suites (e.g., Advanced Encryption Standard (AES), such as AES 128-bit (AES128)), physical layer (PHY) parameters for guiding frame transmission to reduce conflicts, a random value, a nonce value, and session information (e.g., a session number). The random and/or nonce values may be employed to prevent a man-in-the-middle attack and/or a replay attack. In some embodiments, some portions of the data body can be secured, such as by encryption or hashing, as will be discussed in more detail depending on embodiment.

In some embodiments, the AKM parameters can include one or more cryptographic parameters. In some embodiments, the AKM parameters include a scalar value that can be an input into an encryption algorithm and an element value that can be an output of the encryption algorithm. In some embodiments, the encryption algorithm is associated with an elliptical curve, where the scalar value denotes a position on the elliptical curve, and the element value represents the position on the elliptical curve that is selected by the scalar value.

In various embodiments, the fifth field of the frame includes frame check data, although not every frame or packet need include frame check data. The frame check data can be data that can be used by the receiving device (e.g., the powered wireless device 110 or the AMP device 120 respectively) to verify that the frame (or packet) was received without errors or modification. In some embodiments, the frame check data can include unsecured error check data such as checksum data, cyclic redundancy check (CRC) data, or secured (e.g., encrypted or hashed) error check data such as message integrity code (MIC) data depending on the application and level of network attachment.

Figure 1B:
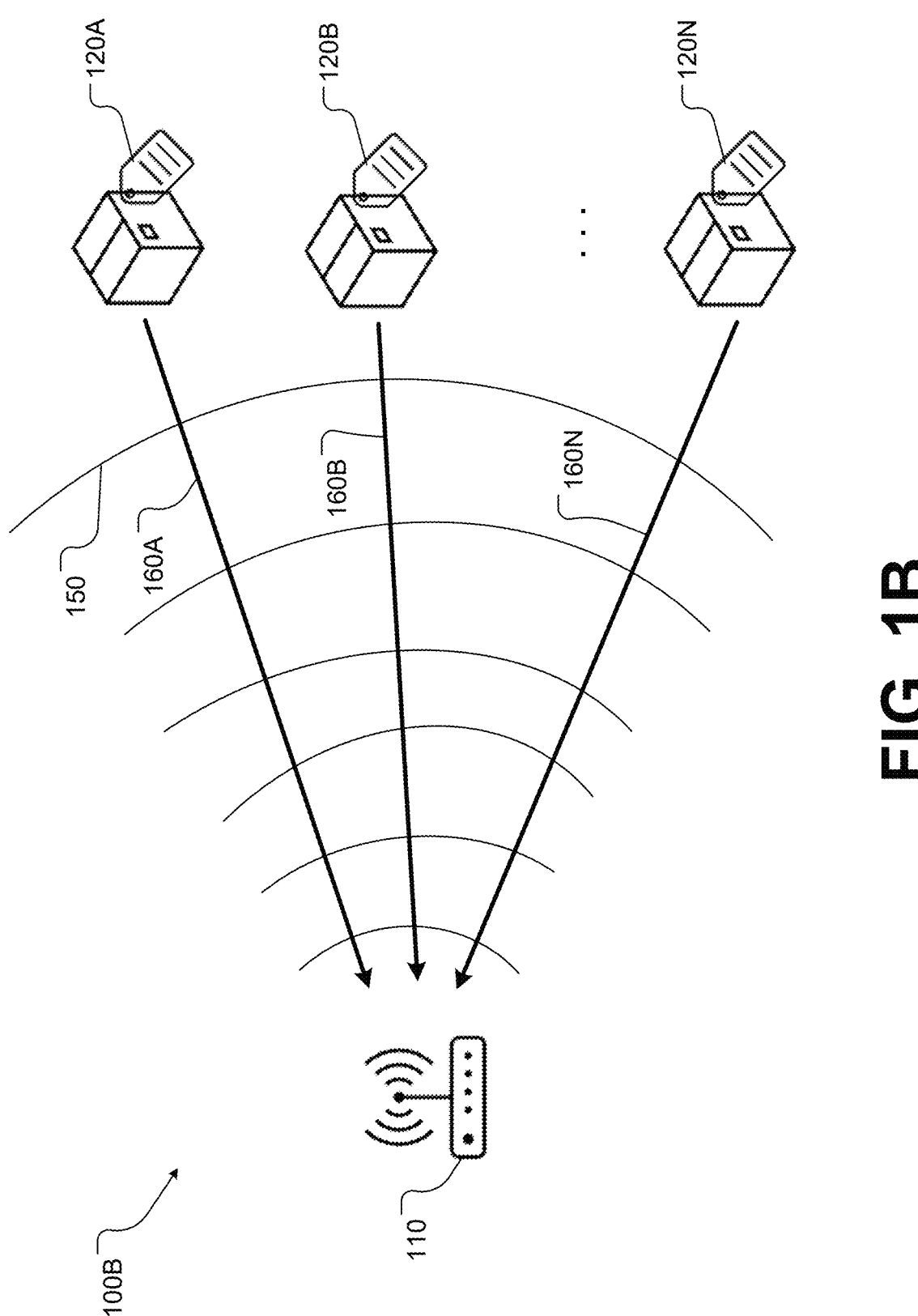
FIG. 1B is a block diagram of an exemplary wireless network configured for a powered wireless device broadcasting an identification (ID) request frame to multiple AMP devices according to some embodiments.

FIG. 1B is a block diagram of an exemplary wireless network 100B configured for a powered wireless device broadcasting an identification (ID) request frame to multiple AMP devices according to some embodiments. The wireless network 100B can include at least some of the components referred to in wireless network 100A (FIG. 1A). In some embodiments, the wireless network 100B includes the powered wireless device 110 that is configured to broadcast an identification (ID) request frame 150 to a plurality of AMP devices, e.g., a first AMP device 120A, a second AMP device 120B, up through an Nth AMP device 120N. Thus, as discussed with reference to Table 1, the ID request frame 150 can include a MAC multicast or broadcast address directed to the plurality of AMP devices. In embodiments, the ID request frame 150 is transmitted with a first random address as the source address to maintain privacy and provide enhanced security while establishing and during an encrypted wireless communication session.

In some embodiments, each of the plurality of AMP devices can reply to the broadcasted ID request frame with a separate ID response frame that can each include a second random address as a source MAC address. More specifically, the first AMP device 120A can transmit a first ID response 160A, the second AMP device 120B can transmit a second ID response 160B, and so forth to the Nth AMP device 120C, which can transmit a third ID response 160N. As will be discussed in more detail, the AMP devices that are able to generate a second hash value content that matches a first hash value retrieved from the ID request frame 150, can successfully have identified the powered wireless device 110. With that successful identification, these AMP devices can then generate an ID response using a secret that it has in common with the powered wireless device 110 and having a third hash value that the powered wireless device is also able to match. The details of these interchanges will be discussed in more detail with reference to FIGS. 2A-2C, FIGS. 3-4, FIGS. 8A-8B, and FIGS. 9-10.

Figure 1C:
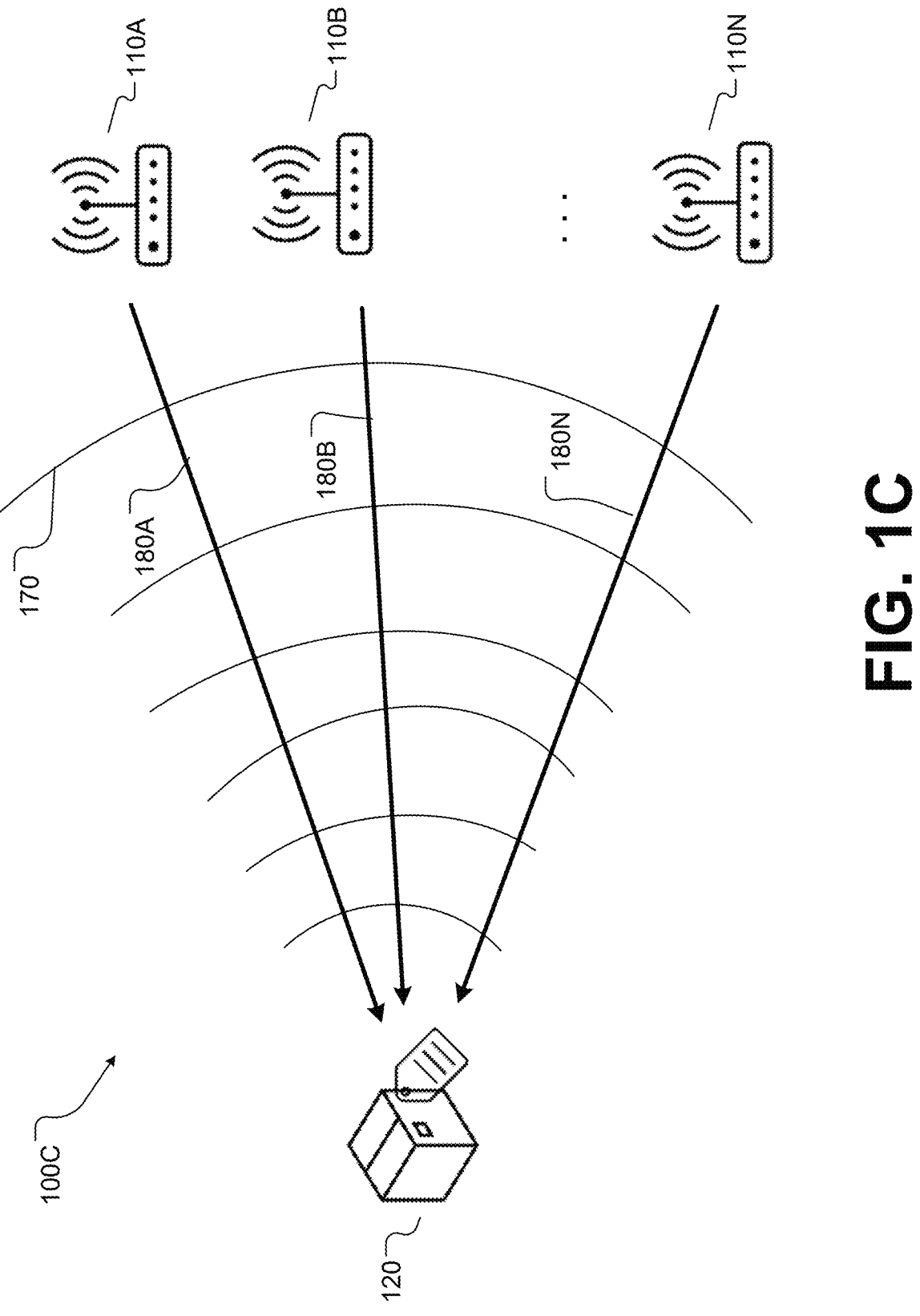
FIG. 1C is a block diagram of an exemplary wireless network configured for an AMP device broadcasting an initialization request frame to multiple powered wireless devices according to some embodiments.

FIG. 1C is a block diagram of an exemplary wireless network 100C configured for an AMP device broadcasting an initialization request frame to multiple powered wireless devices according to some embodiments. The wireless network 100C can include at least some of the components referred to in wireless network 100A (FIG. 1A). In some embodiments, the wireless network 100C includes the AMP device 120 that is configured to broadcast an initialization request frame 170 to a plurality of powered wireless devices, e.g., a first powered wireless device 110A, a second powered wireless device 110B, and up through an Nth powered wireless device 110N. Thus, as discussed with reference to Table 1, the initialization request frame 170 can include a MAC multicast or broadcast address directed to the plurality of powered wireless devices 110A . . . 110N. In embodiments, the initialization request frame 170 is transmitted with a first random address as the source address to maintain privacy and provide enhanced security while establishing and during an encrypted wireless communication session.

In some embodiments, each of the plurality of powered wireless devices 110A . . . 110N can perform a checksum operation or attempt to match a hash value to that of the initialization request frame 170 to authenticate access to an encrypted wireless communication session with the AMP device 120. Having performed one of these two types (or another type) of initial authentication, an authorized powered wireless device (one or more of the plurality of powered wireless devices 110A, 110B, . . . 110N) can retrieve a shared secret with the AMP device 120 and generate a data request frame that includes encrypted content, e.g., including an encrypted command that the powered wireless device wants the AMP device 120 to execute in order to obtain data stored by the AMP device 120. Thus, for example, the first powered wireless device 110A can transmit a first data request frame 180A, the second powered wireless device 110B can transmit a second data request frame 180B, on through to an Nth powered wireless device 180N that can transmit an Nth data request frame. Each of these data requests can also include a second random address as a source MAC address. Assuming the secret is shared between such a powered wireless device and the AMP device 120, the AMP device 120 will be able to both confirm the shared secret (e.g., via a message integrity code (MIC) match) and decrypt the encrypted command based on contents of the data request frame. These and other interactions between the AMP device 120 and the plurality of powered wireless devices will be discussed in more detail with reference to FIGS. 5A-5C and FIGS. 6-7.

Figure 2A:
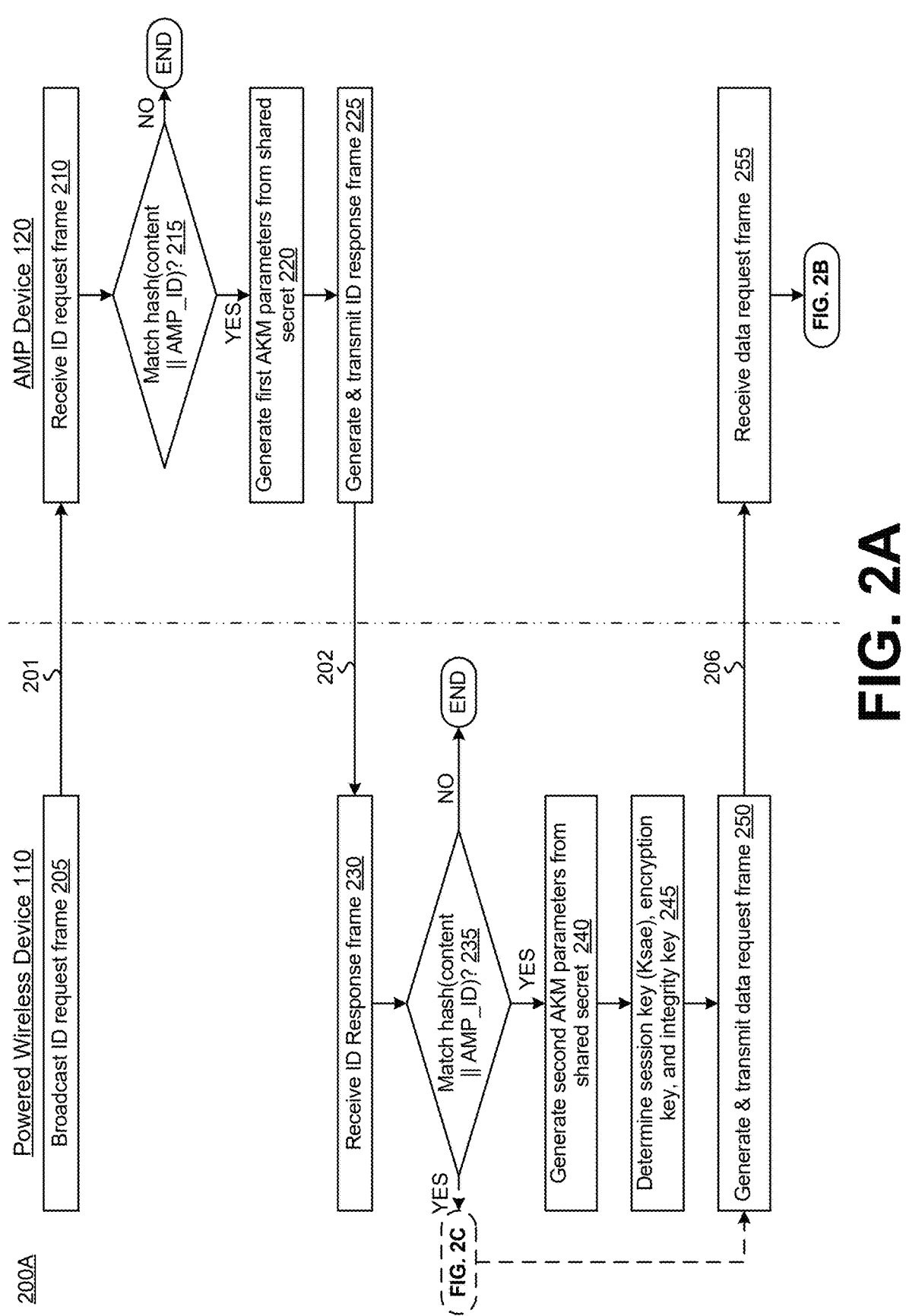
FIG. 2A and FIG. 2B are a flow diagram of an example method for preserving privacy in a secure transaction initiated by a powered wireless device according to some embodiments.
Figure 2B:
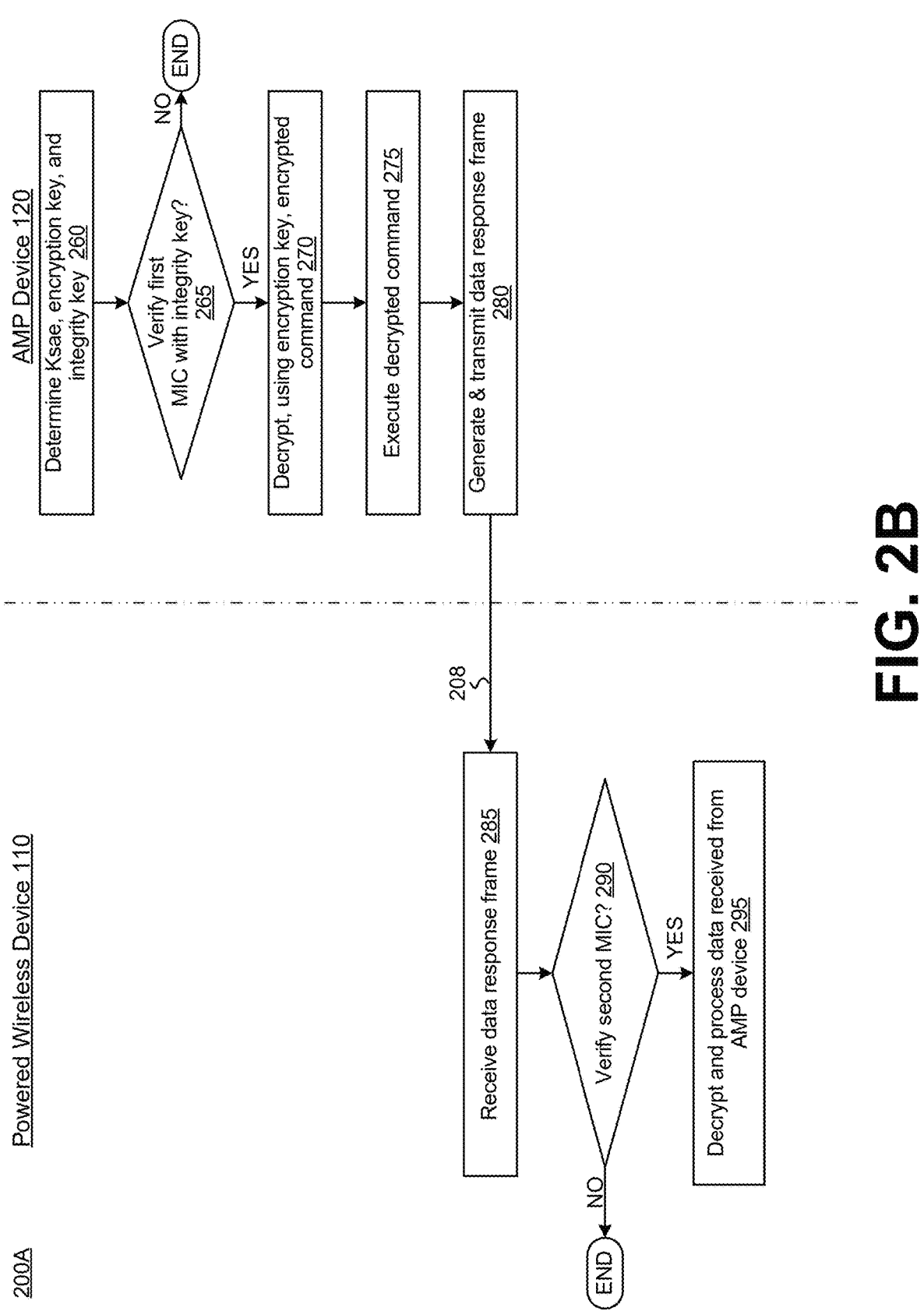

FIG. 2A and FIG. 2B are a flow diagram of an example method 200A for preserving privacy in a secure transaction initiated by a powered wireless device 110 according to some embodiments. The method 200A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200A is performed by processing logic of the powered wireless device 110 and/or by a representative AMP device 120 (FIGS. 1A-1B) depending on operation. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the powered wireless device 110 causes an ID request frame 201 to be broadcast to a plurality of AMP devices (see FIG. 1B). As discussed, the ID request frame 201 can include a first random address as a source MAC address (e.g., as a sender ID of Table 1) to ensure privacy of the powered wireless device 110. In embodiments, the random address will be valid as a MAC address of the powered wireless device 110 only during the encrypted wireless communication session with the AMP device.

In at least some embodiments, the ID request frame 201 includes a first plurality of cleartext fields and a first hash value generated from a combination of a content of the first plurality of cleartext fields and an identifier of the AMP device (e.g., the AMP ID). In embodiments, the first plurality of cleartext fields includes, e.g., a session identifier, one or more frame-exchange parameters, a random value, and a nonce value. A combination and/or different values than these are envisioned, and thus specifically listed values for different frames herein are by example only. In embodiments, the AMP ID is not a word that can be found in a dictionary and contains enough entropy or randomness to be difficult to guess by a typical wireless device.

At operation 210, the AMP device 120 receives the ID request frame 201 that was broadcast by the powered wireless device 110.

At operation 215, the AMP device 120 generates a second hash value from a combination of the content and the identifier of the AMP device, which is retrieved from memory of the AMP device 120. Further, at operation 215, the AMP device 120 determines whether the first hash value matches the second hash value. In response to determining that the first hash value does not match the second hash value, the AMP device 120 terminates a procedure of establishing an encrypted wireless communication session with the powered wireless device 110.

In alternative embodiments, the AMP device 120 instead has a public key that is known by the powered wireless device 110. The ID request frame 201 in such embodiments can include a random number, a nonce, and first encrypted content using the public key. The first encrypted content can be an encrypted combination of the values of the first plurality of cleartext fields and the identifier of the AMP device 120. These alternatives may be more practical for higher-performing AMP devices 120. For example, the AMP device 120 could then generate second encrypted content using the same values of the first plurality of cleartext fields along with an identifier retrieved from memory of the AMP device 120. In this way, the AMP device 120 can instead attempt to match the second encrypted content with the first encrypted content to be able to be authenticated to move to operation 220.

At operation 220, in response to determining, at operation 215, that the first hash value matches the second hash value, the AMP device 120 generates first authentication and key (AKM) parameters. For example, the AMP device 120 can retrieve, from memory, a secret that is shared with the powered wireless device, select an AKM method to be employed, and generate, using the secret and the AKM method, the one or more first AKM parameters. In some embodiments, the first AKM parameters include a first scalar value and a first element value. The first scalar value can be a value selected by the AMP device 120 and used as input to a cryptographic algorithm to produce the first element value. Other AKM parameters herein can be similarly generated.

In various embodiments, AKM methods include one or more of a password-based challenge and response, simultaneous authentication of equals (SAE), public/private key trust method (e.g., using security certificates), or the like. In some embodiments, the AKM method is based on a cipher block, where data is encrypted in fixed-size blocks (e.g., 64 bits, 128 bits, etc.). Cleartext can be divided into blocks and each block is independently encrypted using the same encryption key, where encryption of each block can be dependent on encryption of a previous block. In alternative embodiments, the AKM method is based on a cipher stream, where data is encrypted bit by bit. Cleartext can be combined with a pseudorandom stream of bits (e.g., cyphertext) using a bitwise exclusive-or (XOR) function.

At operation 225, the AMP device 120 generates and transmits an ID response frame 202 that includes the one or more first AKM parameters with which to establish an encrypted wireless communication session with the powered wireless device. In embodiments, the ID response frame 202 includes the first random address of the powered wireless device 110 as the destination MAC address. Further, the ID response frame 202 can includes, as the source MAC address, a second random address to be associated with the AMP device 120, thus also preserving privacy of the AMP device 120.

In some embodiments, also at operation 225, the AMP device 120 generates a third hash value from a combination of a content of a second plurality of cleartext fields of the ID response frame 202 and the identifier of the AMP device 120. In embodiments, generating the ID response frame 202 includes concatenating the content of the second plurality of cleartext fields with the third hash value. In some embodiments, the second plurality of cleartext fields further includes the session identifier, one or more frame-exchange parameters, a second random value, and a second nonce value. In some embodiments, a combination of these parameters are employed or different values are used, and therefore, these are provided by way of example.

At operation 230, the AMP device 120 receives the ID response frame 202 from the AMP device 120 and parses the ID response frame 202.

At operation 235, the powered wireless device 110 generates a fourth hash value from the content of the second plurality of cleartext fields and the identifier of the AMP device. The powered wireless device 110 can then determine whether the third hash value matches the fourth hash value. In response to determining that the third hash value does not match the fourth hash value, the powered wireless device 110 terminates a procedure of establishing an encrypted wireless communication session with the AMP device 120. In response to determining that the third hash value matches the fourth hash value, the powered wireless device 110 can either request access to communicate with the AMP device 120 via the network server 130, as described in relation to FIG. 2C, or passes to operation 240 without requiring the help of the network server.

At operation 240, in response to determining, at operation 235, that the third hash value matches the fourth hash value, the AMP device 120 generates second AKM parameters. For example, the powered wireless device 110 can retrieve, from memory, the secret that is shared with the AMP device 120, select the AKM method to be employed, and generate, using the secret and the AKM method, the one or more second AKM parameters. For example, the secret can be stored in memory (e.g., in a data structure, as an entry in a lookup table, a matrix, a linked list, a data file, or the like) based on the identifier of the AMP device 120. In another example, a first secret can be stored (and used) with respect to a first one or more AMP device(s) 120, and a second secret can be stored (and used) with respect to a second one or more AMP device(s) 120. In alternative embodiments, the first AKM parameters are determined based on a secret that is shared between the AMP device 120 and the network server 130.

At operation 245, the powered wireless device 110 determines a session key from the first AKM parameters and the second AKM parameters. The session key can be, for example, a Ksae derived during an SAE authentication process, e.g., where each of the powered wireless device 110 and the AMP device 120 prove to each other that each knows the shared secret without actually exchanging the shared secret. Other form of key generation are also envisioned. Also at operation 245, the powered wireless device 110 can, using the session key, generate an encryption key and an integrity key.

At operation 250, the powered wireless device 110 generates and transmits a data request frame 206 to the AMP device 120 (e.g., directed to the second random address) in order to obtain data desired from the AMP device 120, such as sensor or environmental data, as previously discussed. Also as part of operation 250, in some embodiments, the powered wireless device 110 encrypts a command (e.g., a data request command) using the encryption key and determines a first message integrity code (MIC) using the integrity key. In some embodiments, the data request frame 206 includes one or more frame-exchange parameters, one or more second AKM parameters, the first MIC, and the encrypted command. The data request frame 206 can optionally also include the session ID and a nonce value. In some embodiments, the frame-exchange parameters include a cipher type (e.g., a cipher suite). The cipher type can be associated with an AKM method. In some embodiments, the cipher type is associated with a cipher algorithm (as described above). As described above, AMP device 120 can select the AKM method. In some embodiments, the powered wireless device 110 can select the AKM method.

At operation 255, the AMP device 120 receives the data request frame 206 from the powered wireless device. In some embodiments, where the data request frame 206 was generated based on an access response packet received from the network server 130 (see FIG. 2C), the data request frame 206 can include one or more second AKM parameters generated by the network server, a first message integrity code (MIC) determined using an integrity key generated from a session key received from the network server, and an encrypted command determined with an encryption key generated from the session key. In embodiments, the data request frame 206 includes the first random address as the source MAC address.

With additional reference to FIG. 2B, at operation 260, the AMP device 120 determines an encryption key and an integrity key using the one or more first AKM parameters and the one or more second AKM parameters. For example, as the powered wireless device 110 did at operation 245, the AMP device 120 that now has the second AKM parameters from the data request frame, can determine the session key (or Ksae). Also at operation 260, the powered wireless device 110 can, using the session key, generate an encryption key and an integrity key.

At operation 265, the AMP device 120 determines whether the first MIC is verified with the integrity key. In response to the first MIC not being verified, the AMP device 120 terminates a procedure of establishing an encrypted wireless communication session with the powered wireless device 110.

At operation 270, in response to the first MIC being verified, the AMP device 120 decrypts, using the encryption key, the encrypted command to generate a decrypted command.

At operation 275, the AMP device 120 executes the decrypted command, e.g., to determine what data is desired and to retrieve the desired data or information. In some embodiments, executing the decrypted command includes generating a second MIC using the integrity key and generating encrypted data using the encryption key to encrypt data including at least one of status or environmental data retrieved from a coupled sensor.

At operation 280, the AMP device 120 generates and transmits, to the powered wireless device 110, a data response frame 208 that includes the second MIC and the encrypted data. In some embodiments, the data response frame 208 also includes a session ID and a nonce value. Further, the data response frame 208 can include the first random address as the destination MAC address of the powered wireless device 110 and the second random address as the source MAC address of the AMP device 120.

At operation 285, the powered wireless device 110 receives the data response frame 208 from the AMP device 120.

At operation 290, the powered wireless device 110 determines whether the second MIC is verified. In response to the second MIC not being verified, the powered wireless device 110 terminates a procedure of establishing an encrypted wireless communication session with the AMP device 120.

At operation 295, in response to the second MIC being verified, the powered wireless device decrypts and processes the decrypted data received from the AMP device 120.

Figure 2C:
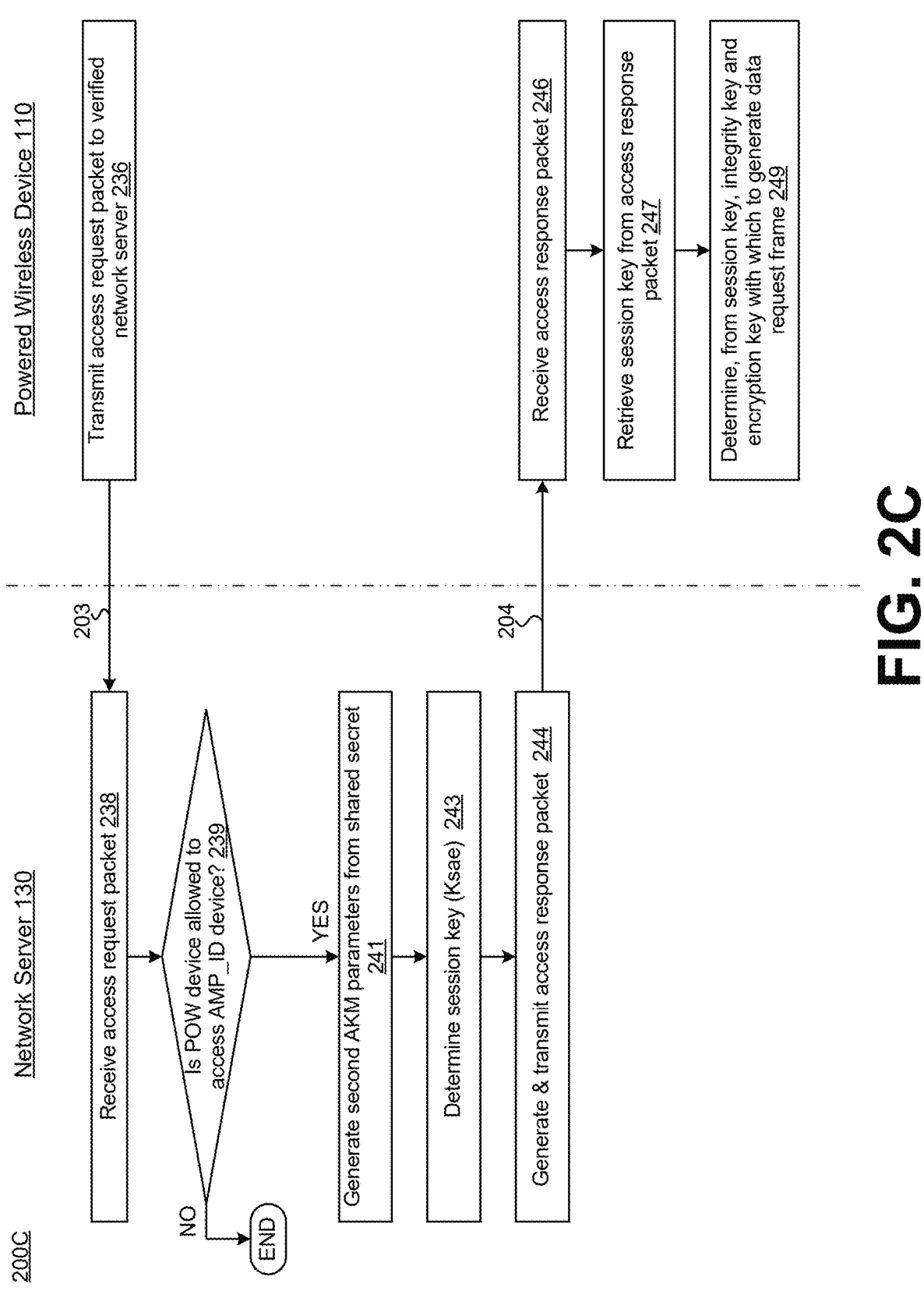
FIG. 2C is a flow diagram of an example method for employing a network server within the method of FIGS. 2A-2B to authorize the powered wireless device according to some embodiments.

FIG. 2C is a flow diagram of an example method 200B for employing a network server within the method 200A of FIGS. 2A-2B to authorize the powered wireless device 110 according to some embodiments. The method 200B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200B is performed by processing logic of the powered wireless device 110 and/or by the network server 130 (FIGS. 1A-1B) depending on operation. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As a result of going through the network server 130 to authenticate and initialize the encrypted wireless communications session, at operation 220 (FIG. 2A), the AMP device 120 can instead select an AKM method to be employed, retrieve, from memory of the AMP device 120, a secret that is shared with the network server 130 communicatively coupled to the powered wireless device 110, and generate, using the secret and the AKM method, the one or more first AKM parameters. Further, the ID response frame 202 transmitted at operation 225 can also include the URL of the network server 130 to which the powered wireless device 110 is to connect in order to be approved to engaged in the encrypted wireless communications session.

At operation 236, the powered wireless device 110 transmits an access request packet 203 to a verified network server (e.g., via the URL) such as the network server 130 of FIG. 1A. In some embodiments, the access request packet includes the session ID, the one or more first AKM parameters, the identifier of the AMP device 120 (e.g., the AMP ID), an identifier of the powered wireless device 110 (e.g., a POW ID), and a credential of the powered wireless device 110 (e.g., a POW credential). In some embodiments, for example, the identifier and the credential of the powered wireless device 110 is a username (or other ID) and password supplied by the powered wireless device 110 according to at least one security protocol.

For example, the processing logic of the powered wireless device 110 can securely communicate with the network server 130 to obtain authorization and data to establish an encrypted wireless communication session with the AMP device 120. In some embodiments, securely communicating with the network server 130 includes establishing a secure connection with the network server 130 using security protocols, such as any of Hypertext Transfer Protocol Secure (HTTPS), Authentication Authorization and Accounting (AAA) frameworks, Secure Socket Layer (SSL), Transport Layer Security (TLS), Internet Protocol Security (IPSec), Secure Shell (SSH), Zero Trust, and/or any combination thereof.

At operation 238, the network server 130 receives the access request packet 203 from the powered wireless device 110. The network server 130 can parse and act on this access request packet 203 as follows.

At operation 239, the network server 130 determines whether the powered wireless device 110 is authorized to access the identifier of the AMP device 120 (e.g., the AMP ID) to be able to establish the encrypted wireless communication session with the AMP device 120. In some embodiments, the network server 130 uses the identifier and credential of the powered wireless device 110 to verify that the powered wireless device 110 is authorized to securely communicate with that particular AMP device 120, e.g., which is associated with the identifier of the AMP device (or AMP ID). In response to the powered wireless device 110 not being authorized to securely communicate with the AMP device 120, the network server 130 terminates the network session with powered wireless device 110 and can optionally transmit a no-access grant in a response packet (e.g., in lieu of the access response packet 204—see operation 244). In this way, the processing logic of the network server 130 securely communicates with the powered wireless device 110 to determine authorization and provide data pertaining to an encrypted wireless communication session between the powered wireless device 110 and the AMP device 120. In some embodiments, securely communicating with the powered wireless device 110 includes establishing a secure connection with the network server 130 using security protocols, such as one or more of those discussed with reference to operation 236.

In some embodiments, the processing logic of the network server 130 maintains a data structure (e.g., lookup table, matrix, a linked list, a data file, or the like) of user IDs that are authorized to communicate with respective AMP IDs. In some embodiments, the data structure can be stored at data store 125 (see FIG. 1A). In some embodiments, the network server 130 can include a user authentication module or process that authorizes a powered wireless device 110 to access a respective AMP device 120 (based on the ID of the AMP device 120) responsive to the user ID and corresponding user credentials satisfying a user credential criterion. For example, a user ID and password (e.g., corresponding user credential) can be authenticated by the network server 130, and the network server 130 can determine that the powered wireless device 110 associated with the user ID is authorized to communicate with the AMP device 120.

The authentication parameters and/or data structures stored on the network server 130 that correspond to the AMP device 120 (based on the ID of the AMP device 120) can be changed based on user access requirements and credential management parameters for the AMP device 120. For example, an organization with multiple powered wireless devices 110 can deploy multiple AMP devices 120. Because the AMP devices 120 lack sufficient power to be reprogrammed while deployed in an operational network, changes to access permissions (e.g., whether a particular powered wireless device is authorized to communicate with a particular AMP device) cannot be executed at the AMP device 120. Instead, the static network address programmed to the particular AMP device can point to the network server 130, and a portion of the network server 130 associated with the ID of the particular AMP device can store an authentication data structure identifying particular powered wireless devices (or user IDs) that are authorized to communicate with the particular AMP device. If a new user or powered wireless device 110 is added to the organization, the authentication data structure for the particular AMP device can be updated to reflect whether the new user or powered wireless device is authorized to communicate with the particular AMP device. In some embodiments, one authentication data structure is maintained for multiple AMP devices 120. In some embodiments, if the processing logic of the network server 130 identifies the user ID (or other identifier) corresponding to the powered wireless device 110 in the authentication data structure, the processing logic of the network server 130 can determine that the powered wireless device 110 is authorized to communicate with the AMP device 120.

At operation 241, in response to the network server 130 authorizing the powered wireless device 110 to securely communicate with the AMP device 120, the network server generates second AKM parameters. For example, the network server 130 can retrieve, from memory, the secret that is shared with the AMP device 120, select the AKM method to be employed, and generate, using the secret and the AKM method, the one or more second AKM parameters.

At operation 243, the network server 130 determines a session key from the first AKM parameters and the second AKM parameters. The session key can be, for example, a Ksae derived during an SAE authentication process, e.g., where each of the network server 130 and the AMP device 120 prove to each other that each knows the shared secret without actually exchanging the shared secret.

At operation 244, the network server 130 generates and transmits an access response packet 204 to the powered wireless device 110. In some embodiments, the access response packet 204 includes the session ID, the second AKM parameters, and the session key, which can be securely transmitted under the secure transmission protocol of the Internet session with the powered wireless device 110. The access response packet 204 can also be considered to be an access grant packet.

At operation 246, the powered wireless device 110 receives the access response packet 204 from the network server 130.

At operation 247, the powered wireless device 110 retrieves the session key (or Ksae) from the access response packet 204.

At operation 249, the powered wireless device 110 determines, from the session key, an encryption key and an integrity key with which to generate the data request frame 206 when the method 200B links back up with the method 200A through operation 250 (see FIG. 2A).

FIG. 3 is a flow diagram of an example method 300 for preserving privacy in a secure transaction initiated by a powered wireless device according to at least one embodiment. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by processing logic of the powered wireless device 110 (FIGS. 1A-1B). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing logic broadcasts an ID request frame to multiple AMP devices that harvest environmental energy. In embodiments, the ID request frame including first cleartext fields and a first hash value generated from a combination of content of the cleartext fields and an identifier of an AMP device of the multiple AMP devices.

At operation 310, the processing logic uses, within the ID request frame, a random address as a source MAC address and, as a destination MAC address, one of a broadcast address or a group address directed at the multiple AMP devices.

At operation 315, the processing logic receives an ID response frame from the AMP device that includes second cleartext fields and a second hash value generated from a combination of content of the second cleartext fields and the identifier of the AMP device.

At operation 320, the processing logic generates a third hash value from a combination of content of the second cleartext fields, retrieved from the ID response frame, and the identifier of the AMP device retrieved from memory.

At operation 325, the processing logic determines whether the third hash value matches the second hash value.

At operation 330, in response to the third hash value not matching the second hash value, the processing logic terminates the procedure of establishing an encrypted wireless communication session with the AMP device.

At operation 340, in response to the third hard value matching the second hash value, the processing logic generates a data request frame having an encrypted command for execution by the AMP device.

FIG. 4 is a flow diagram of a method 400 that explains the example method 300 of FIG. 3 from an perspective of an AMP device according to at least one embodiment. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by processing logic of the AMP device 120 that harvests environment energy (FIGS. 1A-1B). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic receives an identification (ID) request frame broadcast by a powered wireless device. In embodiments, a source MAC address of the ID request frame is a first random address. In some embodiments, the ID request frame includes a first plurality of cleartext fields and a first hash value generated from a combination of a content of the first plurality of cleartext fields and an identifier of the AMP device.

At operation 410, the processing logic generates a second hash value from a combination of the content and the identifier of the AMP device retrieved from memory of the AMP device.

At operation 420, the processing logic determines whether the first hash value matches the second hash value.

At operation 430, in response to determining that the first hash value does not match the second hash value, the processing logic terminates a procedure of establishing an encrypted wireless communication session with the powered wireless device.

At A operation 440, in response to determining that the first hash value matches the second hash value, the processing logic generates an ID response frame comprising one or more first authentication and key (AKM) parameters with which to establish an encrypted wireless communication session with the powered wireless device.

Figure 5A:
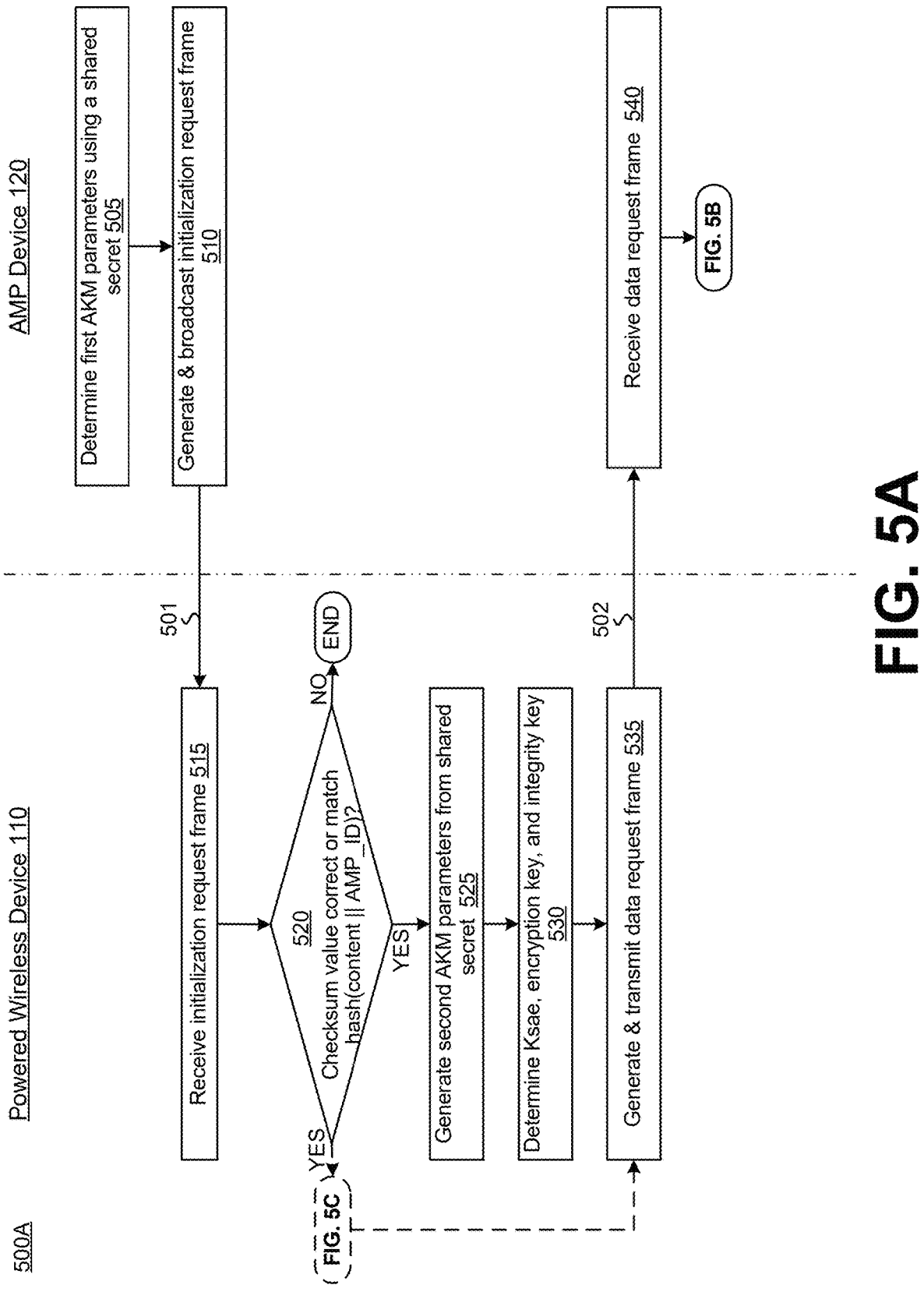
FIG. 5A and FIG. 5B are a flow diagram of an example method for preserving privacy in a secure transaction initiated by an AMP device according to some embodiments.
Figure 5B:
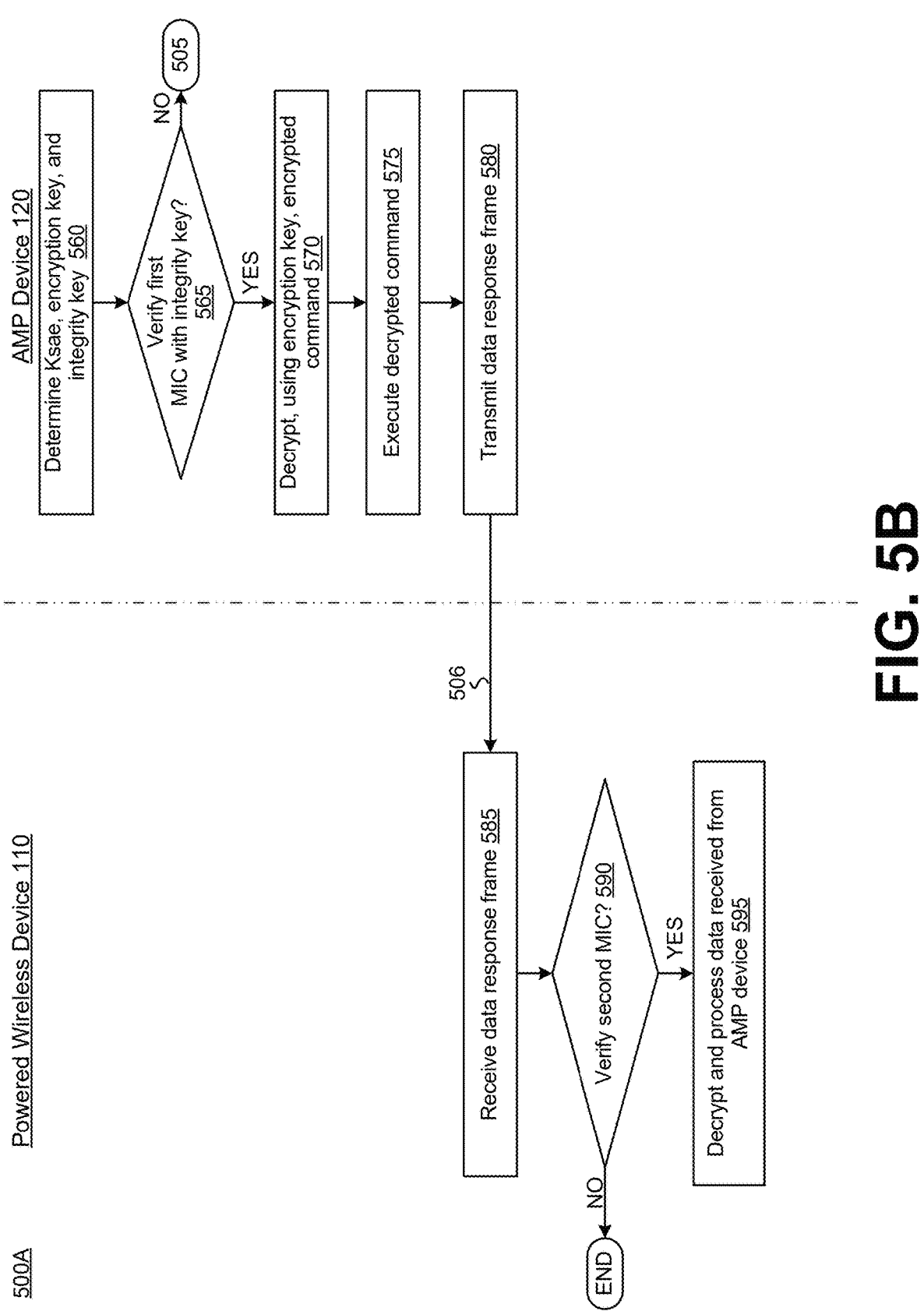

FIG. 5A and FIG. 5B are a flow diagram of an example method 500A for preserving privacy in a secure transaction initiated by an AMP device according to some embodiments. The method 500A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500A is performed by processing logic of the AMP device 120 that harvests environment energy and of one or more powered wireless devices 110 (FIG. 1A and FIG. 1C). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the AMP device 120 determines one or more first authentication and key management (AKM) parameters, e.g., using a shared secret. In embodiments, the secret is shared with at least one of the powered wireless devices 110A, 110B, . . . 110N (see FIG. 1C).

At operation 510, the AMP device 120 generates and broadcasts, to a plurality of powered wireless devices, an initialization request frame 501. In some embodiments, the initialization request frame 501 includes one or more frame-exchange parameters, the one or more first AKM parameters, and encrypted content with which a powered wireless device 110 of the plurality of powered wireless devices is to establish an encrypted wireless communication session with the AMP device. As discussed with reference to Table 1, in some embodiments, the processing logic uses (or employs), within the initialization request frame 501, a first random address as a source media access control (MAC) address (e.g., of the AMP device 120) and one of a broadcast address or a group address as a destination MAC address of the powered wireless devices. In embodiments, the first random address will be valid as a MAC address of the AMP device 120 only during the encrypted wireless communication session, e.g., but not for a subsequent or future wireless communication session.

With additional reference to operation 510, in some embodiments, the content that was encrypted includes an identifier of the AMP device that is also known to the powered wireless device 110. In some embodiments, the processing logic encrypts, using a public key, the content (to include the AMP ID) to generate the encrypted content. In embodiments, the content further includes values from a set of cleartext fields of the initialization request frame 501. For example, the set of cleartext fields can include the one or more frame-exchange parameters, the one or more first AKM parameters, a session identifier, and a nonce value.

In an alternative embodiment, at operation 510, the AMP device 120 includes, in the initialization request frame 501, a first plurality of cleartext fields and a first hash value generated from a combination of a content of the first plurality of cleartext fields and an identifier of the AMP device (e.g., the AMP ID). In embodiments, the first plurality of cleartext fields includes, e.g., a session identifier, one or more frame-exchange parameters, a random value, and a nonce value. A combination and/or different values than these are envisioned, and thus specifically listed values for different frames herein are by example only. In embodiments, the AMP ID is not a word that can be found in a dictionary and contains enough entropy or randomness to be difficult to guess by a typical wireless device.

At operation 515, the powered wireless device 110 receives the initialization request frame 501 from the AMP device 120.

At operation 520, the powered wireless device 110 verifies whether the checksum value of the received initialization request frame 501 is correct. If the error-checking value is not correct, the method 500A ends, e.g., the powered wireless device 110 terminates a procedure of establishing an authenticated and encrypted network session with the AMP device 120. If the error-checking value is correct, the powered wireless device 110 proceeds to operation 525, or alternatively, to the operations of FIG. 2C if using the network server 130 to seek approval to engage the AMP device 120 in the encrypted wireless communication session.

In the alternative embodiment, at operation 520, generates a second hash value from a combination of the content of the cleartext fields and the identifier of the AMP device retrieved from memory of the powered wireless device 110. Further, at operation 520, the powered wireless device 110 determines whether the first hash value matches the second hash value. In response to determining that the first hash value does not match the second hash value, the powered wireless device 110 terminates a procedure of establishing an encrypted wireless communication session with the AMP device 120. In response to determining that the first hash value matches the second hash value, the powered wireless device 110 can either request access to communicate with the AMP device 120 via the network server 130, as described in relation to FIG. 5C, or passes to operation 525 without requiring the help of the network server 130. This alternative embodiment of employing hash values can be most viable where there are a small number of AMP devices (and thus the powered wireless device 110 has limitations on the number of hashing operations to be performed to verify authorization of access to those AMP devices).

At operation 525, in response to determining, at operation 520, that the checksum value is correct or that the first hash value matches the second hash value (in the alternative embodiment), the powered wireless device 110 generates second authentication and key (AKM) parameters. For example, the powered wireless device 120 can retrieve, from memory, a secret that is shared with the AMP device 120, select an AKM method to be employed, and generate, using the secret and the AKM method, the one or more first AKM parameters. For example, the secret can be stored in memory (e.g., in a data structure, as an entry in a lookup table, a matrix, a linked list, a data file, or the like) based on the identifier of the AMP device 120. In another example, a first secret can be stored (and used) with respect to a first one or more AMP device(s) 120, and a second secret can be stored (and used) with respect to a second one or more AMP device(s) 120. In alternative embodiments, the first AKM parameters are determined based on a secret that is shared between the AMP device 120 and the network server 130 (see FIG. 5C).

In various embodiments, AKM methods include one or more of a password-based challenge and response, simultaneous authentication of equals (SAE), public/private key trust method (e.g., using security certificates), or the like. In some embodiments, the AKM method is based on a cipher block, where data is encrypted in fixed-size blocks (e.g., 64 bits, 128 bits, etc.). Plaintext can be divided into blocks and each block is independently encrypted using the same encryption key, where encryption of each block can be dependent on encryption of a previous block. In alternative embodiments, the AKM method is based on a cipher stream, where data is encrypted bit by bit. Plaintext can be combined with a pseudorandom stream of bits (e.g., cyphertext) using a bitwise exclusive-or (XOR) function.

At operation 530, the powered wireless device 110 determines a session key from the first AKM parameters and the second AKM parameters. The session key can be, for example, a Ksae derived during an SAE authentication process, e.g., where each of the powered wireless device 110 and the AMP device 120 prove to each other that each knows the shared secret without actually exchanging the shared secret. Other key-generation procedures are envisioned as well. Also at operation 530, the powered wireless device 110 can, using the session key, generate an encryption key and an integrity key.

At operation 535, the powered wireless device 110 generates and transmits a data request frame 502 to the AMP device 120 (e.g., directed to the first random address) in order to obtain data desired from the AMP device 120, such as sensor or environment data as previously discussed. In embodiments, the powered wireless device 110 includes, in the data request frame, the first random address as the destination address of the AMP device 120 and a second random address as the source MAC frame of the powered wireless device 110.

Also as part of operation 535, in some embodiments, the powered wireless device 110 encrypts a command (e.g., a data request command) using the encryption key and determines a first message integrity code (MIC) using the integrity key. In some embodiments, the data request frame 502 includes one or more frame-exchange parameters, one or more second AKM parameters, the first MIC, and the encrypted command. The data request frame 206 can optionally also include the session ID and a nonce value. In some embodiments, the frame-exchange parameters include a cipher type (e.g., a cipher suite). The cipher type can be associated with an AKM method. In some embodiments, the cipher type is associated with a cipher algorithm (as described above). As described above, AMP device 120 selects the AKM method. In some embodiments, the powered wireless device 110 can select the AKM method.

At operation 540, the AMP device 120 receives the data request frame 502 transmitted by the powered wireless device 110. In some embodiments, where the data request frame 502 was generated based on an access response packet received from the network server 130 (see FIG. 5C), the data request frame 502 can include one or more second AKM parameters generated by the network server, a first message integrity code (MIC) determined using an integrity key generated from a session key received from the network server, and an encrypted command determined with an encryption key generated from the session key. In embodiments, the data request frame 502 includes the first random address as the destination MAC address.

With additional reference to FIG. 5B, at operation 560, the AMP device 120 determines an encryption key and an integrity key using the one or more first AKM parameters and the one or more second AKM parameters. For example, as the powered wireless device 110 did at operation 530, the AMP device 120 that now has the second AKM parameters from the data request frame 502 can determine the session key (or Ksae). Also at operation 560, the powered wireless device 110 can, using the session key, generate the encryption key and the integrity key.

At operation 565, the AMP device 120 determines whether the first MIC is verified with the integrity key. In response to the first MIC not being verified, the AMP device 120 terminates a procedure of establishing an encrypted wireless communication session with the powered wireless device 110.

At operation 570, in response to the first MIC being verified, the AMP device 120 decrypts, using the encryption key, the encrypted command to generate a decrypted command.

At operation 575, the AMP device 120 executes the decrypted command, e.g., to determine what data is desired and to retrieve the desired data or information. In some embodiments, executing the decrypted command includes generating a second MIC using the integrity key and generating encrypted data using the encryption key to encrypt data including at least one of status or environmental data retrieved from a coupled sensor.

At operation 580, the AMP device 120 transmits a data response frame 506 that includes the second MIC and the encrypted data. In some embodiments, the data response frame 506 also includes a session ID and a nonce value. Further, the data response frame 506 can include the first random address as the destination MAC address of the powered wireless device 110 and the second random address as the source MAC address of the AMP device 120.

At operation 585, the powered wireless device 110 receives the data response frame 506 from the AMP device 120.

At operation 590, the powered wireless device 110 determines whether the second MIC is verified. In response to the second MIC not being verified, the powered wireless device 110 terminates a procedure of establishing an encrypted wireless communication session with the AMP device 120.

At operation 595, in response to the second MIC being verified, the powered wireless device decrypts and processes the decrypted data received from the AMP device 120.

Figure 5C:
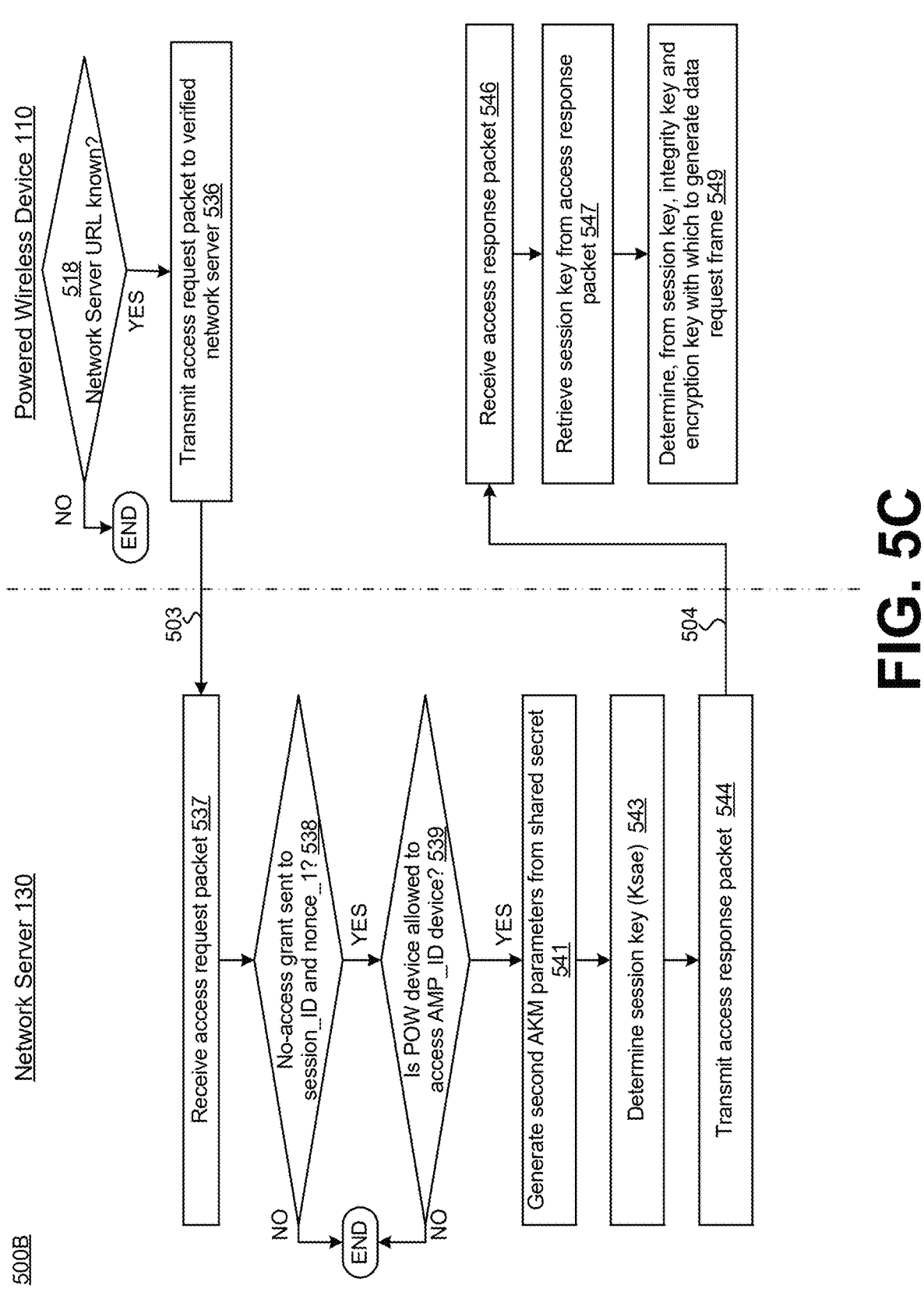
FIG. 5C is a flow diagram of an example method for employing a network server within the method of FIGS. 5A-5B to authorize the powered wireless device according to some embodiments.

FIG. 5C is a flow diagram of an example method 500B for employing a network server within the method 500A of FIGS. 5A-5B to authorize the powered wireless device according to some embodiments. The method 500B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500B is performed by processing logic of the powered wireless device 110 and/or by the network server 130 (FIGS. 1A and 1B) depending on operation. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As a result of going through the network server 130 to authenticate and initialize the encrypted wireless communications session, at operation 505 (FIG. 5A), the AMP device 120 can instead select an AKM method to be employed, retrieve, from memory of the AMP device 120, a secret that is shared with the network server 130 communicatively coupled to the powered wireless device 110, and generate, using the secret and the AKM method, the one or more first AKM parameters. Further, the initialization request frame 501 transmitted at operation 510 can also include the URL of the network server 130 to which the powered wireless device 110 is to connect in order to be approved to engaged in the encrypted wireless communications session.

At operation 518 (which could be combined with operation 520), the powered wireless device 110 determines whether the URL of the network server 130 is known. If the URL is not known, the powered wireless device 110 terminates a procedure of establishing an encrypted wireless communication session with the powered wireless device 110. Otherwise, the powered wireless device 110 proceeds to operation 536.

At operation 536, the powered wireless device 110 transmits an access request packet 503 to a verified network server (e.g., via the URL) such as the network server 130 of FIG. 1A. In some embodiments, the access request packet 503 includes a plurality of cleartext fields, such as the session ID, the one or more first AKM parameters, an identifier of the powered wireless device 110 (e.g., a POW ID), a credential of the powered wireless device 110 (e.g., a POW credential), a nonce value, and the identifier of the AMP device 120 (e.g., the AMP ID). In embodiments, for example, the identifier and the credential of the powered wireless device 110 is a username (or other ID) and password supplied by the powered wireless device 110 according to at least one Internet security protocol. In some embodiments, the powered wireless device 110 encrypts, using a public key, a combination of the content of the cleartext fields and the identifier of the AMP device 120 (or AMP ID) to generate encrypted content. The powered wireless device 110 can then include the encrypted content in the access request packet 503, e.g., as a form of verification and to securely protect the AMP ID. In this way, the access request packet 503 can include additional security (compared to the method 200C of FIG. 2C) since the AMP device 120 was the wireless device initiator of the wireless communications session.

In embodiments, the processing logic of the powered wireless device 110 can securely communicate with the network server 130 to obtain authorization and data to establish an encrypted wireless communication session with the AMP device 120. In some embodiments, securely communicating with the network server 130 (e.g., knowing the URL) includes establishing a secure connection with the network server 130 using security protocols, such as any of Hypertext Transfer Protocol Secure (HTTPS), Authentication Authorization and Accounting (AAA) frameworks, Secure Socket Layer (SSL), Transport Layer Security (TLS), Internet Protocol Security (IPSec), Secure Shell (SSH), Zero Trust, and/or any combination thereof.

At operation 537, the network server 130 receives the access request packet 503 from the powered wireless device 110. The network server 130 can parse and act on this access request packet 503 as follows.

At operation 538, the network server 130 determines whether the network server 130 has previously transmitted a no-access grant in an access response packet for the supplied session ID. In some embodiments, the nonce value from the access request packet 503 is also verified. Although operation 538 is optional, performing operation 538 enables stronger security. In this way, the network server 130 can protect against a replay attack from a potentially different powered wireless device for the current network session. If such a no-access grant had been transmitted previously, at operation 539, the network server 130 terminates the network session with the powered wireless device 110. Otherwise, the network server 130 proceeds to operation 539 and the rest of the method 500B.

At operation 539, the network server 130 determines whether the powered wireless device 110 is authorized to access the AMP device 120 having a particular identifier (e.g., the AMP ID) to be able to establish the encrypted wireless communication session with the AMP device 120. In some embodiments, the network server 130 decrypts, using its private key, the encrypted content of the access request packet 503 and compares the decrypted content with the content received in the cleartext fields of the access request packet 502. If the content does not match, the network server 130 terminates the network session with the powered wireless device 110 and can optionally transmit a no-access grant in a response packet (e.g., in lieu of the access response packet 504—see operation 544). This decryption is also a secure way to retrieve the identifier of the AMP device 120.

Further, also at operation 539, the network server 130 uses the identifier and credential of the powered wireless device 110 to verify that the powered wireless device 110 is authorized to securely communicate with that particular AMP device 120, e.g., which is associated with the identifier of the AMP device (or AMP ID). In response to the powered wireless device 110 not being authorized to securely communicate with the AMP device 120, the network server 130 terminates the network session with the powered wireless device 110 and can optionally transmit a no-access grant in a response packet (e.g., in lieu of the access response packet 504—see operation 544). In this way, the processing logic of the network server 130 can securely communicate with the powered wireless device 110 to determine authorization and provide data pertaining to an encrypted wireless communication session between the powered wireless device 110 and the AMP device 120. In some embodiments, securely communicating with the powered wireless device 110 includes establishing a secure connection with the network server 130 using Internet or network security protocols, such as one or more of those discussed with reference to operation 536.

In some embodiments, the processing logic of the network server 130 maintains a data structure (e.g., lookup table, matrix, a linked list, a data file, or the like) of user IDs that are authorized to communicate with respective AMP IDs. In some embodiments, the data structure can be stored at data store 125 (described with reference to FIG. 1A). In some embodiments, the network server 130 can include a user authentication module or process that authorizes a powered wireless device 110 to access a respective AMP device 120 (based on the ID of the AMP device 120) responsive to the user ID and corresponding user credentials satisfying a user credential criterion. For example, a user ID and password (e.g., corresponding user credential) can be authenticated by the network server 130, and the network server 130 can determine that the powered wireless device 110 associated with the user ID is authorized to communicate with the AMP device 120.

The authentication parameters and/or data structures stored on the network server 130 that correspond to the AMP device 120 (based on the ID of the AMP device 120) can be changed based on user access requirements and credential management parameters for the AMP device 120. For example, an organization with multiple powered wireless devices 110 can deploy multiple AMP devices 120. Because the AMP devices 120 lack sufficient power to be reprogrammed while deployed in an operational network, changes to access permissions (e.g., whether a particular powered wireless device is authorized to communicate with a particular AMP device) cannot be executed at the AMP device 120. Instead, the static network address programmed to the particular AMP device can point to the network server 130, and a portion of the network server 130 associated with the ID of the particular AMP device can store an authentication data structure identifying particular powered wireless devices (or user IDs) that are authorized to communicate with the particular AMP device. If a new user or powered wireless device 110 is added to the organization, the authentication data structure for the particular AMP device can be updated to reflect whether the new user or powered wireless device is authorized to communicate with the particular AMP device. In some embodiments, one authentication data structure is maintained for multiple AMP devices 120. In some embodiments, if the processing logic of the network server 130 identifies the user ID (or other identifier) corresponding to the powered wireless device 110 in the authentication data structure, the processing logic of the network server 130 can determine that the powered wireless device 110 is authorized to communicate with the AMP device 120.

At operation 541, in response to the network server 130 authorizing the powered wireless device 110 to securely communicate with the AMP device 120 (e.g., at both operation 538 and operation 539), the network server 130 generates second AKM parameters. For example, the network server 130 can determine the identifier of the AMP device 120 (or particular AMP ID) as discussed earlier. The network server 130 can then retrieve, from memory, the secret that is shared with the AMP device 120 (e.g., having the particular AMP ID), select the AKM method to be employed, and generate, using the secret and the AKM method, the one or more second AKM parameters.

At operation 543, the network server 130 determines a session key from the first AKM parameters and the second AKM parameters. The session key can be, for example, a Ksae derived during an SAE authentication process, e.g., where each of the network server 130 and the AMP device 120 prove to each other that each knows the shared secret without actually exchanging the shared secret.

At operation 544, the network server 130 generates and transmits an access response packet 504 to the powered wireless device 110. In some embodiments, the access response packet 504 includes the session ID, the second AKM parameters, and the session key, which can be securely transmitted under the secure transmission protocol of the Internet session with the powered wireless device 110. The access response packet 504 can also be considered to be an access grant packet.

At operation 546, the powered wireless device 110 receives the access response packet 504 from the network server 130.

At operation 547, the powered wireless device 110 retrieves the session key (or Ksae) from the access response packet 504.

At operation 549, the powered wireless device 110 determines, from the session key, an encryption key and an integrity key with which to generate the data request frame 502 when the method 500B links back up with the method 500A through operation 535 (see FIG. 5A).

FIG. 6 is a flow diagram of an example method 600 for preserving privacy in a secure transaction initiated by an AMP device according to at least one embodiment. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by processing logic of the AMP device 120 that harvests environment energy (FIG. 1A and FIG. 1C). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic determines one or more first authentication and key management (AKM) parameters.

At operation 620, the processing logic broadcasts, to a plurality of powered wireless devices, an initialization request frame including one or more frame-exchange parameters, the one or more first AKM parameters, and encrypted content with which a powered wireless device of the plurality of powered wireless devices is to establish an encrypted wireless communication session with the AMP device. In some embodiments, the content that was encrypted includes an identifier of the AMP device that is also known to the powered wireless device.

At operation 630, the processing logic uses, within the initialization request frame, a first random address as a source media access control (MAC) address and one of a broadcast address or a group address as a destination MAC address.

FIG. 7 is a flow diagram of a method 700 that explains the example method 600 of FIG. 6 from a perspective of a powered wireless device according to at least one embodiment. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by processing logic of the powered wireless device 110 (FIG. 1A and FIG. 1C).

At operation 710, the processing logic receives an initialization request frame broadcast by an AMP device to multiple powered wireless devices. In embodiments, a source MAC address of the initialization request frame is a random address. In embodiments, the initialization request frame includes one or more first AKM parameters and encrypted content with which to establish an encrypted wireless communication session with the AMP device (where the content that was encrypted includes an identifier of the AMP device that is also known to the powered wireless device).

At operation 720, the processing logic generates one or more second AKM parameters using a secret that is shared with the AMP device.

At operation 730, the processing logic determines, based on the one or more first AKM parameters and the one or more second AKM parameters, an encryption key and an integrity key.

At operation 740, the processing logic transmits a data request frame to the AMP device, the data request frame including a command encrypted with the encryption key, and a MIC generated with the integrity key.

Figure 8A:
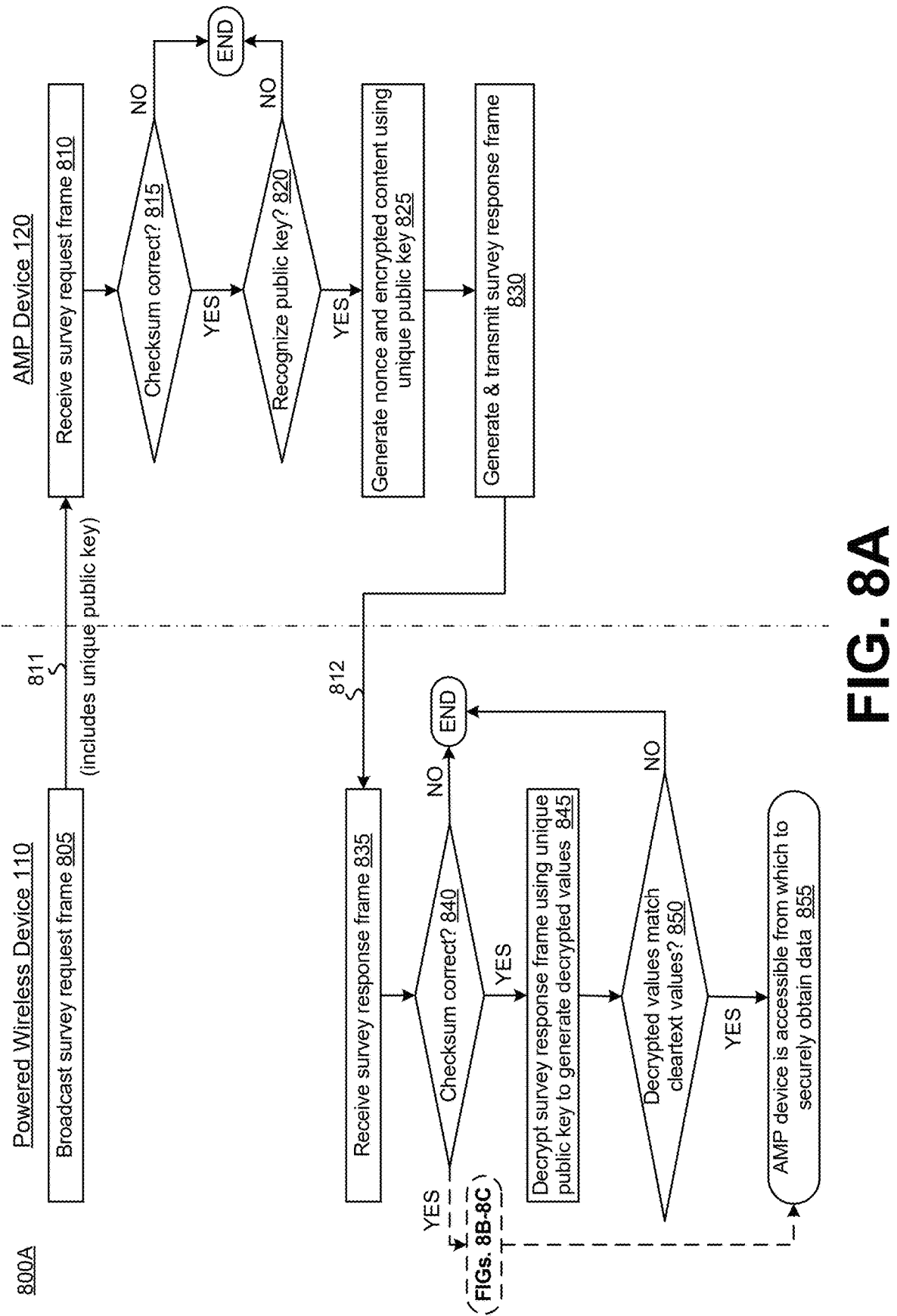
FIG. 8A is a flow diagram of an example method for preserving privacy during discovery of and secure transaction with AMP devices according to some embodiments.

FIG. 8A is a flow diagram of an example method 800A for preserving privacy during discovery of and secure transaction with AMP devices according to some embodiments. The method 800A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800A is performed by processing logic of the powered wireless device 110 and/or by a representative AMP device 120 (FIGS. 1A-1B) depending on operation. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 805, the powered wireless device 110 causes a survey request frame 811 to be broadcast to a plurality of AMP devices (see FIG. 1B). As discussed, the survey request frame 811 can include a first random address as a source MAC address (e.g., as a sender ID of Table 1) to ensure privacy of the powered wireless device 110. In embodiments, the random address will be valid as a MAC address of the powered wireless device 110 only during the encrypted wireless communication session with the AMP device. In embodiments, the survey request frame 811 includes a unique public key to be used by each AMP device, of the plurality of AMP devices, to generate a survey response frame. In some embodiments, the survey request frame 811 also includes the session ID, one or more frame-exchange parameters, a first nonce value, and a checksum value. In embodiments, also at operation 805, the powered wireless device 110 uses, within the survey request frame, a first random address as a source media access control (MAC) address and one of a broadcast address or a group address as a destination MAC address, e.g., directed at the AMP devices.

At operation 810, each AMP device receives the survey request frame 811 from the powered wireless device 110 and parses the survey request frame 811. The remainder of the methods 800A-800C are described from the perspective of an exemplary AMP device, which will be referred to as the AMP device 120 for purposes of explanation.

At operation 815, the AMP device 120 determines whether the checksum value is correct. In response to the checksum value not being correct, the AMP device 120 terminates a procedure of establishing an encrypted wireless communication session with the powered wireless device 110. Otherwise, the method 800A proceeds to operation 820.

At operation 820, the AMP device 120 determines whether the AMP device 120 recognizes the public key by comparing the public key to a locally-stored key, for example. In response to not recognizing the public key, the AMP device 120 terminates the procedure of establishing an encrypted wireless communication session with the powered wireless device 110. Otherwise, the AMP device 120 continues on to operation 825.

At operation 825, the AMP device 120 generates a second nonce value and encrypts, using the unique public key, particular values that can be used by the powered wireless device to authenticate access as well verify use of the unique public key with an authorized AMP device. For example, the AMP device 120 can encrypt a combination of the session ID, the first nonce value, the second nonce value, and an identifier of the AMP device 120 to generate an encrypted combination of content. In other embodiments, the AMP device 120 encrypts a different combination of values or just some of these values to generate the encrypted combination.

At operation 830, the AMP device 120 generates and transmits, to the powered wireless device 110, a survey response frame 812 that includes the session ID, the second nonce value, and the encrypted combination of content. In some embodiments, the AMP device 120 generates the first random address and the second nonce value to be inserted into the survey response frame. In some embodiments, the AMP device 120 uses, within the survey response frame 812, the first random address as a destination MAC address and a second random address as the source MAC address.

At operation 835, the powered wireless device 110 receives the survey response frame 812 from the AMP device 120. In some embodiments, the survey response frame 812 also includes a checksum value and a session ID.

At operation 840, the powered wireless device 110 determines whether the checksum value is correct. In response to the checksum value not being correct, the powered wireless device 110 terminates the procedure of establishing an encrypted wireless communication session with the first AMP device. Otherwise, the powered wireless device 110 moves on to either operation 845 or, if seeking approval to access the AMP device 120, to the operations of FIGS. 8B-8C.

At operation 845, the powered wireless device 100 decrypts the encrypted combination of content using the unique public key to determine a decrypted session ID, a decrypted first nonce value, and a decrypted second nonce value.

At operation 850, the powered wireless device 110 determines whether the decrypted values match the cleartext values. For example, in response to a least one of the session ID, the first nonce value, or the second nonce value not matching the decrypted session ID, the decrypted first nonce value, or the decrypted second nonce value, respectively, the powered wireless device 110 terminates a procedure of establishing an encrypted wireless communication session with the AMP device, e.g., associated with the AMP ID that was also decrypted from the encrypted combination of content.

At operation 855, in response to determining that the session ID, the first nonce value, and the second nonce value matches the decrypted session ID, the decrypted first nonce value, and the decrypted second nonce value, respectively, the powered wireless device 110 determines that the AMP device is accessible from which to securely obtain the data. In this situation, the powered wireless device 110 can successfully proceed with the operations discussed previously associated with generating and transmitting a data request frame to fully move into an encrypted wireless communication session with the AMP device 120 that can lead to obtaining the data accessible to the AMP device 120.

Figures 8B, 8C:
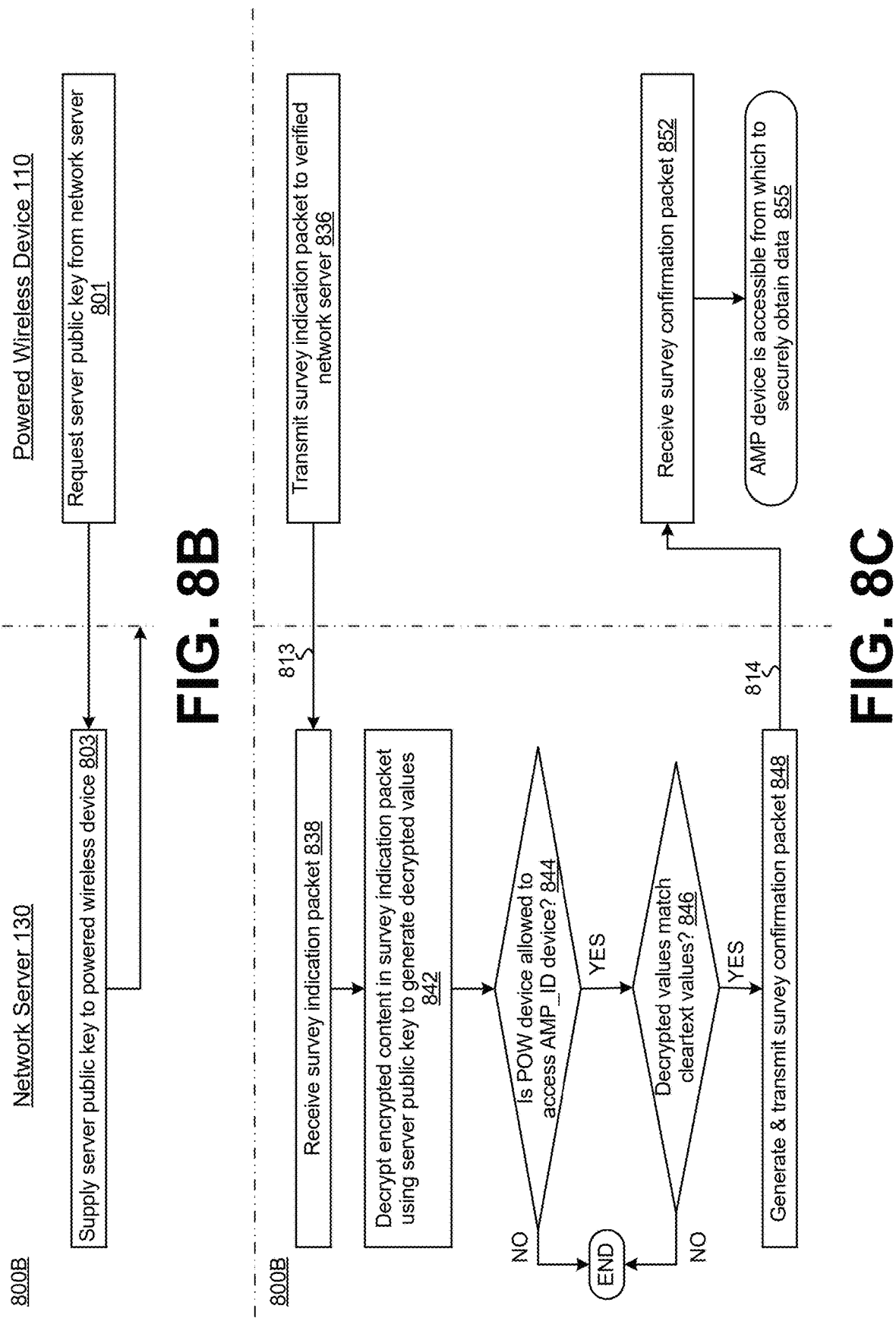
FIG. 8B and FIG. 8C are a flow diagram of an example method for employing a network server within the method of FIG. 8A to determine which AMP devices are accessible according to some embodiments.

FIG. 8B and FIG. 8C are a flow diagram of an example method 800B for employing a network server within the method 800A of FIG. 8A to determine which AMP devices are accessible according to some embodiments. The method 800B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800B is performed by processing logic of the powered wireless device 110 and/or by the network server 130 (FIGS. 1A-1B) depending on operation. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 801, the powered wireless device 110 requests a server public key from the network server 130. In embodiments, the operation 801 is performed before the operation 805 of FIG. 8A so that the survey request frame 811 transmitted to the AMP device 120 contains the server public key, e.g., as the unique public key.

At operation 802, the network server 130 supplies the server public key to the powered wireless device 110. Thus, at operation 805, it should be understood that the survey request frame 811 transmitted to, and received by, the AMP devices contains the server pubic key in these embodiments.

With continued reference to FIG. 8C, at operation 836, the powered wireless device 110 transmits a survey indication packet 813 to the network server 130 that has been verified, e.g., by using a URL or other Internet address received from the AMP device 120 and which can first be verified. In some embodiments, the survey indication packet 813 includes at least some of an identifier (ID) and a credential of the powered wireless device 110, the first nonce, the second nonce, and the encrypted combination of content.

At operation 838, the network server 130 receives and parses the survey indication packet 813 received from the powered wireless device 110.

At operation 842, the network server 130 decrypts the encrypted combination of content to determine, e.g., as discussed with reference to operation 845, a decrypted session ID, a decrypted first nonce value, a decrypted second nonce value, and the identifier of the AMP device (e.g., decrypted AMP ID).

At operation 844, the network server 130 determines whether the powered wireless device 110 is authorized to access the AMP device 120 having a particular identifier (e.g., the AMP ID) to be able to establish the encrypted wireless communication session with the AMP device 120. Because the survey request frame 813 can include the ID and credential of the powered wireless device 110, the network server 130 can check these (such as a username and password or the like) against a database to make this determination with reference to the decrypted AMP ID. If the powered wireless device 110 not authorized to access the AMP device 120 (having the AMP ID), the network server 130 terminates a procedure of helping the powered wireless device 110 establish an encrypted wireless communication session with the AMP device. Otherwise, the method 800B continues on to operation 846.

At operation 846, the network server 130 determines whether the decrypted values match the cleartext values. For example, in response to a least one of the session ID, the first nonce value, or the second nonce value not matching the decrypted session ID, the decrypted first nonce value, or the decrypted second nonce value, respectively, the powered wireless device 110 terminates a procedure of establishing an encrypted wireless communication session with the AMP device, e.g., associated with the decrypted AMP ID. Otherwise, the network server 130 proceeds on to operation 848.

At operation 848, the network server 130 generates and transmits, to the powered wireless device 110, a survey confirmation packet 814 that includes, e.g., the identifier of the AMP device and at least one of the session ID, the first nonce value, and the second nonce value being indicative that the AMP device is accessible from which to securely obtain the data.

At operation 852, the powered wireless deice receives the survey confirmation packet 814 from the network server

130. Again, at operation 855, the powered wireless device 110 determines that the AMP device 120 is accessible from which to securely obtain the data. In this situation, the powered wireless device 110 can successfully proceed with the operations discussed previously associated with generating and transmitting a data request frame to fully move into an encrypted wireless communication session with the AMP device 120 that can lead to obtaining the data accessible to the AMP device 120.

FIG. 9 is a flow diagram of an example method 900 for preserving privacy during discovery of and a secure transaction with AMP devices, as initiated by a powered wireless device according to at least one embodiment. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by processing logic of the powered wireless device 110 and/or by a representative AMP device 120 (FIGS. 1A-1B) depending on operation. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 910, the processing logic broadcasts a survey request frame to a plurality of ambient (AMP) devices that harvest environmental energy. In embodiments, the survey request frame includes a unique public key to be used by each AMP device, of the plurality of AMP devices, to generate a survey response frame.

At operation 920, the processing logic uses, within the survey request frame, a first random address as a source media access control (MAC) address and one of a broadcast address or a group address as a destination MAC address.

At operation 930, the processing logic determines, from each respective survey response frame, whether a corresponding AMP device of the plurality of AMP devices is accessible from which to securely obtain data.

FIG. 10 is a flow diagram of an example method 1000 for preserving privacy during discovery of and a secure transaction with AMP devices, from the perspective of one of the AMP devices according to at least one embodiment. The method 1000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 is performed by processing logic of the AMP device 120 that harvests environment energy (FIG. 1A and FIG. 1C). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1010, the processing logic receives (or causing to be received) a survey request frame broadcast by a powered wireless device, wherein a source medium access control (MAC) address of the survey request frame is a first random address, and wherein the survey request frame comprises a session identifier (ID), a first nonce value, and a unique public key.

At operation 1020, the processing logic encrypts, using the unique public key, a combination of the session ID, the first nonce value, a second nonce value, and an identifier of the AMP device to generate a first encrypted content.

At operation 1030, the processing logic transmits, to the powered wireless device, a survey response frame including the session ID, the second nonce value, and the first encrypted content with which the powered wireless device is to determine whether the AMP device is accessible from which to securely obtain data.

Figure 11:
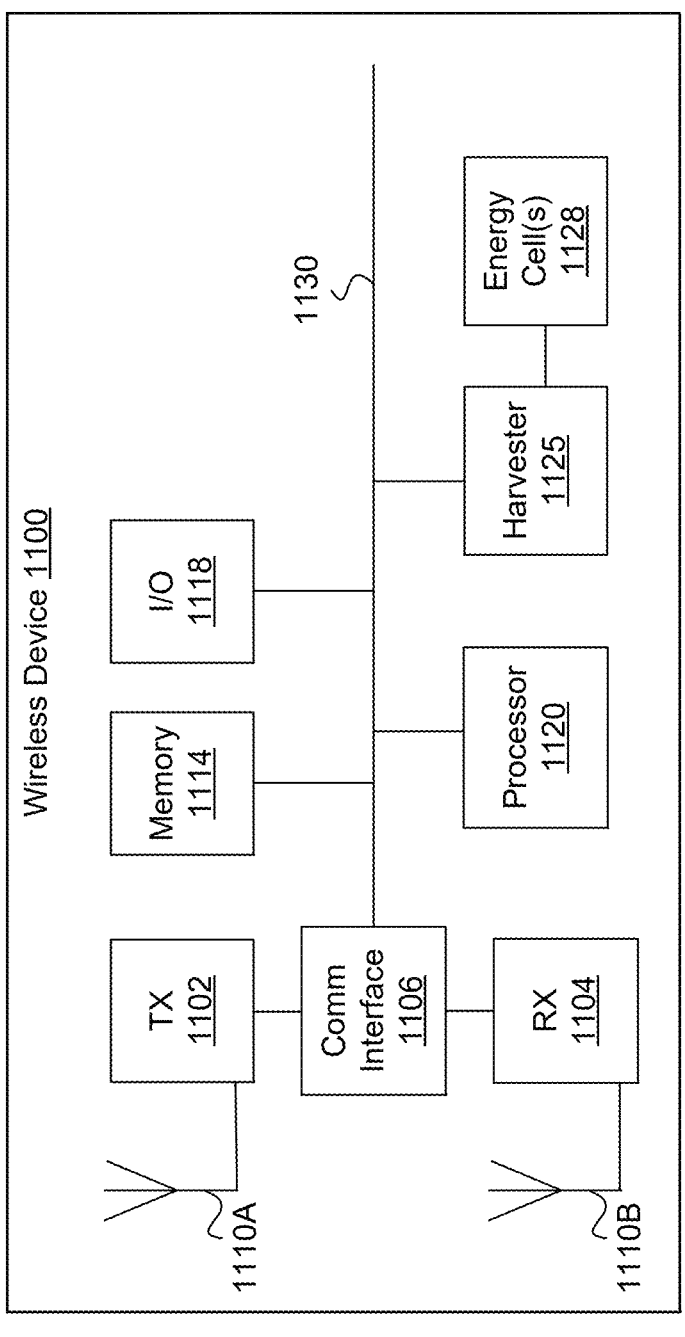
FIG. 11 is a simplified block diagram of an example wireless device, which may represent any of the powered wireless device or client wireless devices discussed herein according to aspects of the disclosure.

FIG. 11 is a simplified block diagram of an example wireless device 1100, which may represent any of the powered wireless device 110 or client wireless devices discussed herein according to aspects of the disclosure. For example, the client wireless devices may include the AMP device 120. In at least some embodiments, the wireless device 1100 includes, but is not be limited to, a transmitter 1102 or TX (e.g., a WLAN transmitter), a receiver 1104 or RX (e.g., a WLAN receiver), a communications interface 1106, at least one TX antenna 1110A coupled to the transmitter 1102, at least one RX antenna 1110B coupled to the receiver 1104, a memory 1114, one or more input/output (I/O) devices 1118 (such as a display screen, a touch screen, a keypad, and the like), a processor 1120, an energy harvester 1125, and energy cells 1128. In embodiments, the wireless device 1100 includes two antennas for multiple input, multiple output (MIMO) operation of a transceiver (e.g., including the TX and RX), which may include switching circuitry to switch between dual bands, including for example, the 2.4 GHz and 5 GHz bands.

These components can all be coupled to a communications bus 1130 or multiple communication buses. In some embodiments, at least some of the components of the wireless device 1100 are directly connected and may thus not be coupled through the communication bus 1130. Thus, illustration of the communication bus 1130 is not be taken as required or limiting for at least some of the components of the wireless device 1100, which may directly intercommunicate.

In some embodiments, aspects of the communication interface 1106 work with the processor 1120 to perform operations or that function as a processing device of the wireless device 1100. In some embodiments, there is a single antenna and multiplexing logic to switch use of the antenna between the TX and RX. In some embodiments, the powered wireless device 110 has no energy harvester, and instead has a battery and/or is analog current (AC)-powered.

In at least some embodiments, the memory 1114 includes storage to store instructions executable by the processor 1120 and/or data generated by the communication interface 1106. In various embodiments, frontend components such as the transmitter 1102, the receiver 1104, the communication interface 1106, and one or more antennas are adapted with or configured for WLAN and WLAN-based frequency bands, e.g., Wi-Fi®, Bluetooth® (BT), Bluetooth® Low Energy (LBE), Ultra-Wideband (UWB), Z-wave™, Zigbee®, LoRa™, Wireless Smart Utility Network® (Wi-SUN®), or other wireless protocol. While some of the protocols may also be referred to as personal area network (PAN) technology, for simplicity, all are broadly referred to as WLAN technology. Future protocols are also envisioned.

In various embodiments, the communications interface 1106 is integrated with the transmitter 1102 and the receiver 1104, e.g., as a frontend of the wireless device 1100. The communication interface 1106 may coordinate, as directed by the processor 1120, to request/receive packets from other wireless devices or those that reflect off of objects. The communications interface 1106 can further process data symbols received by the receiver 1104 in a way that the processor 1120 can perform further processing, including identifying and parsing data packets received within the wireless signals. In some embodiments, the transmitter 1102, receiver 1104, communication interface 1106, and antennas 1110A and 1110B can be referred to herein as a "wireless communication circuit."

In various embodiments, the energy harvester 1125 performs operations disclosed herein in order to capture electromagnetic or RF signals and other types of non-RF energy, e.g., light, temperature gradients, pressure differential, mechanical vibrations, wind energy, and the like, which were discussed with referenced to FIG. 1A. As discussed, the energy harvester 1125, with reference to harvesting energy from RF wireless signals, may be a multi-band harvester in being configured to harvest energy from multiple ranges of frequencies that define different RF bands. In these embodiments, the energy harvester 1125 is also configured to store the harvested energy within the energy cells 1128, which then operate as a power source for the wireless device 1100.

It will be apparent to one skilled in the art that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for Universal Serial Bus (USB) Type-C(USB-C) or USB Power Delivery (PD) mode-transition architecture described herein. The non-transitory computer-readable storage medium may include, but is not limited to, electromagnetic storage medium, read-only memory (ROM), random-access memory (RAM), erasable programmable memory (e.g., Erasable and Programmable Read Only Memory (EPROM) and Electrically Erasable and Programmable Read Only Memory (EEPROM)), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the disclosure has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method comprising:

determining, by an ambient power (AMP) device that harvests environmental energy, one or more first authentication and key management (AKM) parameters;

broadcasting, by the AMP device, to a plurality of powered wireless devices, an initialization request frame comprising one or more frame-exchange parameters, the one or more first AKM parameters, and encrypted content with which a powered wireless device of the plurality of powered wireless devices is to establish an encrypted wireless communication session with the AMP device, wherein the content that was encrypted includes an identifier of the AMP device that is also known to the powered wireless device; and using, by the AMP device within the initialization request frame, a first random address as a source media access control (MAC) address and one of a broadcast address or a group address as a destination MAC address.

2. The method of claim 1, further comprising encrypting, using a public key, the content to generate the encrypted content, wherein the content further includes values from a set of cleartext fields of the initialization request frame, and wherein the set of cleartext fields comprises the one or more frame-exchange parameters, the one or more first AKM parameters, a session identifier, and a nonce value.

3. The method of claim 1, wherein the first random address will be valid as a MAC address of the AMP device only during the encrypted wireless communication session.

4. The method of claim 1, wherein determining the one or more first AKM parameters comprises:

selecting an AKM method to be employed;

retrieving, from memory of the AMP device, a secret that is shared with the powered wireless device; and generating, using the secret and the AKM method, the one or more first AKM parameters.

5. The method of claim 4, further comprising:

receiving, from the powered wireless device, a data request frame including an encrypted command, a first message integrity code (MIC), and one or more second AKM parameters, wherein the data request frame includes the first random address as the destination MAC address and a second random address as the source MAC address of the powered wireless device;

determining an encryption key and an integrity key using the one or more first AKM parameters and the one or more second AKM parameters;

verifying the first MIC with the integrity key;

decrypting, using the encryption key, the encrypted command to generate a decrypted command; and executing the decrypted command.

6. The method of claim 5, wherein the data request frame further includes a session identifier and a nonce value.

7. The method of claim 5, wherein executing the decrypted command comprises:

generating a second MIC using the integrity key;

generating encrypted data using the encryption key to encrypt data including at least one of status or environmental data retrieved from a coupled sensor; and transmitting, to the powered wireless device, a data response frame comprising the second MIC, the encrypted data.

8. The method of claim 1, wherein determining the one or more first AKM parameters comprises:

selecting an AKM method to be employed;

retrieving, from memory of the AMP device, a secret that is shared with a network server communicatively coupled to the powered wireless device; and generating, using the secret and the AKM method, the one or more first AKM parameters.

9. The method of claim 8, further comprising:

receiving, from the powered wireless device, a data request frame including:

one or more second AKM parameters generated by the network server;

a first message integrity code (MIC) determined using an integrity key generated from a session key received from the network server; and an encrypted command determined with an encryption key generated from the session key, wherein the data request frame includes the first random address as the destination MAC address;

determining the encryption key and the integrity key using the one or more first AKM parameters and the one or more second AKM parameters;

verifying the first MIC with the integrity key;

decrypting the encrypted command with the encryption key to generate a decrypted command; and executing the decrypted command.

10. A wireless device comprising:

an ambient power (AMP) collection circuit configured to harvest environmental energy;

a wireless communication circuit; and a processing device coupled to the AMP collection circuit and the wireless communication circuit, the processing device to:

determining one or more first authentication and key management (AKM) parameters;

causing the wireless communication circuit to broadcast, to a plurality of powered wireless devices, an initialization request frame comprising one or more frame-exchange parameters, the one or more first AKM parameters, and encrypted content with which a powered wireless device of the plurality of powered wireless devices is to establish an encrypted wireless communication session with the wireless device, wherein the content that was encrypted includes an identifier of the wireless device that is also known to the powered wireless device; and employing, within the initialization request frame, a first random address as a source media access control (MAC) address and one of a broadcast address or a group address as a destination MAC address.

11. The wireless device of claim 10, wherein the processing device is further to encrypt, using a public key, the content to generate the encrypted content, wherein the content further includes values from a set of cleartext fields of the initialization request frame, and wherein the set of cleartext fields comprises the one or more frame-exchange parameters, the one or more first AKM parameters, a session identifier, and a nonce value.

12. The wireless device of claim 10, wherein the first random address will be valid as a MAC address of the wireless device only during the encrypted wireless communication session.

13. A method comprising:

receiving, by an ambient power (AMP) device that harvests environmental energy, an identification (ID) request frame broadcast by a powered wireless device, wherein a source MAC address of the ID request frame is a first random address, and wherein the ID request frame includes a first plurality of cleartext fields and a first hash value generated from a combination of a content of the first plurality of cleartext fields and an identifier of the AMP device;

generating, by the AMP device, a second hash value from a combination of the content and the identifier of the AMP device, which is retrieved from memory of the AMP device;

determining whether the first hash value matches the second hash value;

in response to determining that the first hash value does not match the second hash value, terminating a procedure of establishing an encrypted wireless communication session with the powered wireless device; and in response to determining that the first hash value matches the second hash value, generating an ID response frame comprising one or more first authentication and key (AKM) parameters with which to establish an encrypted wireless communication session with the powered wireless device.

14. The method of claim 13, wherein the first random address will be valid as a MAC address of the powered wireless device only during the encrypted wireless communication session with the AMP device, the method further comprising transmitting the ID response frame to the first random address of the powered wireless device, wherein the ID response frame includes, as the source MAC address, a second random address to be associated with the AMP device.

15. The method of claim 13, wherein the content of the first plurality of cleartext fields comprises at least two of: a session identifier, one or more frame-exchange parameters, a random value, or a nonce value.

16. The method of claim 13, further comprising:

retrieving, from memory, a secret that is shared with the powered wireless device;

selecting an AKM method to be employed; and generating, using the secret and the AKM method, the one or more first AKM parameters.

17. The method of claim 16, further comprising:

generating a third hash value from a combination of a content of a second plurality of cleartext fields of the ID response frame and the identifier of the AMP device; and wherein generating the ID response frame comprises concatenating the content of the second plurality of cleartext fields with the third hash value.

18. The method of claim 17, wherein the content of the second plurality of cleartext fields further comprises at least two of: a session identifier, one or more frame-exchange parameters, a random value, and a nonce value.

19. The method of claim 16, further comprising:

receiving, from the powered wireless device, a data request frame including an encrypted command, a first message integrity code (MIC), and one or more second AKM parameters, wherein the data request frame includes the first random address as the source MAC address;

determining an encryption key and an integrity key using the one or more first AKM parameters and the one or more second AKM parameters;

verifying the first MIC with the integrity key;

decrypting, using the encryption key, the encrypted command to generate a decrypted command; and executing the decrypted command.

20. The method of claim 19, wherein the data request frame further includes a session identifier and a nonce value.

21. The method of claim 19, wherein executing the decrypted command comprises:

generating a second MIC using the integrity key;

generating encrypted data using the encryption key to encrypt data including at least one of status or environmental data retrieved from a coupled sensor; and transmitting, to the powered wireless device, a data response frame comprising the second MIC, the encrypted data.

22. The method of claim 13, wherein determining the one or more first AKM parameters comprises:

selecting an AKM method to be employed;

retrieving, from memory of the AMP device, a secret that is shared with a network server communicatively coupled to the powered wireless device; and generating, using the secret and the AKM method, the one or more first AKM parameters.

23. The method of claim 22, further comprising:

receiving, from the powered wireless device, a data request frame including:

one or more second AKM parameters generated by the network server;

a first message integrity code (MIC) determined using an integrity key generated from a session key received from the network server; and an encrypted command determined with an encryption key generated from the session key, wherein the data request frame includes the first random address as the source MAC address;

determining the encryption key and the integrity key using the one or more first AKM parameters and the one or more second AKM parameters;

verifying the first MIC with the integrity key;

decrypting the encrypted command with the encryption key to generate a decrypted command; and executing the decrypted command.

\* \* \* \* \*